United States Patent
Wu et al.

(10) Patent No.: US 9,206,588 B2
(45) Date of Patent: Dec. 8, 2015

(54) SHOVEL PROVIDED WITH ELECTRIC SWIVELING APPARATUS AND METHOD OF CONTROLLING THE SAME

(75) Inventors: Chunnan Wu, Yokosuka (JP); Shipeng Li, Yokosuka (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 107 days.

(21) Appl. No.: 14/117,101

(22) PCT Filed: May 17, 2012

(86) PCT No.: PCT/JP2012/062583
§ 371 (c)(1),
(2), (4) Date: Nov. 12, 2013

(87) PCT Pub. No.: WO2012/161062
PCT Pub. Date: Nov. 29, 2012

(65) Prior Publication Data
US 2015/0142276 A1    May 21, 2015

(30) Foreign Application Priority Data
May 26, 2011 (JP) ................................. 2011-118058

(51) Int. Cl.
*E02F 9/20* (2006.01)
*E02F 9/12* (2006.01)
(Continued)

(52) U.S. Cl.
CPC .............. *E02F 9/2033* (2013.01); *E02F 9/123* (2013.01); *E02F 9/128* (2013.01); *E02F 9/2095* (2013.01); *E02F 9/262* (2013.01); *E02F 9/265* (2013.01); *G01S 13/04* (2013.01)

(58) Field of Classification Search
CPC ......... E02F 9/2033; E02F 9/123; E02F 9/128; E02F 9/2095; E02F 9/262; E02F 9/265
USPC .......................................................... 701/50
See application file for complete search history.

(56) References Cited

U.S. PATENT DOCUMENTS 7,659,677 B2 * 2/2010 Yoshimatsu et al. .......... 318/371
8,405,328 B2 * 3/2013 Komiyama et al. ........... 318/369
(Continued)

FOREIGN PATENT DOCUMENTS

| CN | 1938485 A | 3/2007 |
| CN | 1938485 B | 6/2010 |

(Continued)

OTHER PUBLICATIONS

International Search Report dated Aug. 28, 2012 corresponding to International Patent Application No. PCT/JP2012/062583 and English translation thereof.

*Primary Examiner* — Richard Camby
(74) *Attorney, Agent, or Firm* — Squire Patton Boggs (US) LLP

(57) ABSTRACT

A swiveling body is installed on a base in a swivelable manner. An electric motor for swiveling swivels the swiveling body. An inverter supplies electric power to the electric motor for swiveling. An obstacle detector detects an obstacle around the base and transmits a detected result to a control unit. When the obstacle detector detects the obstacle, the control unit determines whether or not the obstacle is present within a monitoring region, and when the obstacle is present inside the monitoring region, the control unit stops the electric motor for swiveling. In order to avoid danger, the swiveling operation can be stopped more safely.

12 Claims, 21 Drawing Sheets

(51) Int. Cl.
*E02F 9/26* (2006.01)
*G01S 13/04* (2006.01)

(56) References Cited

U.S. PATENT DOCUMENTS 8,437,923 B2 * 5/2013 Sano et al. .................. 701/50
8,543,296 B2 * 9/2013 Sano .............................. 701/42

2007/0273316 A1 11/2007 Yoshimatsu et al.

FOREIGN PATENT DOCUMENTS

| EP | 1731680 A1 | 12/2006 |
| JP | 05-331882 A | 12/1993 |
| JP | 2003-105807 A | 4/2003 |
| JP | 2005-290902 A | 10/2005 |
| WO | WO 2005/095719 A1 | 10/2005 |

* cited by examiner

SHOVEL PROVIDED WITH ELECTRIC SWIVELING APPARATUS AND METHOD OF CONTROLLING THE SAME

TECHNICAL FIELD

The present invention relates to a shovel provided with an electric swiveling (slewing) apparatus in which a swiveling body is installed on a base such as traveling equipment and relates to a method of controlling the same.

BACKGROUND ART

In a swiveling work machine that includes a swiveling body which is installed on a traveling body (base) in a swivelable manner, if an entry of an intruder is detected in a no entry zone, a swiveling operation is controlled to be forcibly stopped.

PRIOR ART DOCUMENT

Patent Literature

[PTL 1] Japanese Unexamined Patent Application Publication No. 2003-105807

SUMMARY OF INVENTION

Technical Problem to be Solved by Invention

In a hydraulic swiveling work machine, a hydraulic valve is closed to suppress supply of pressure oil to a swivel-drive unit when halting a swiveling body. The swiveling body is halted by suppressing a flow of the pressure oil. In a case where the swiveling body is swiveled using an electric motor, it is difficult to halt the swiveling body immediately due to moment of inertia of the swiveling body, even if electric power supply to an electric motor for swiveling is stopped. Particularly in a swiveling work machine that is provided with an attachment such as a shovel, the moment of inertia of the swiveling body is increased, consequently it is more difficult to halt the swiveling body. In order to avoid danger, there is a need for technology of stopping a swiveling operation more safely.

Means of Solving Problem

According to an aspect of the present invention, there is provided a shovel provided with an electric swiveling apparatus including: a base; a swiveling body that is installed on the base in a swivelable manner; an electric motor for swiveling that causes the swiveling body to swivel; an inverter that supplies electric power to the electric motor for swiveling; a control unit; and an obstacle detector that detects an obstacle around the base and transmits a detected result to the control unit. When the obstacle detector detects the obstacle, the control unit determines whether or not the obstacle is present within a monitoring region and when the obstacle is present inside the monitoring region, the control unit stops the electric motor for swiveling.

According to another aspect of the invention, there is provided a method of controlling a shovel provided with an electric swiveling apparatus including: a base; a swiveling body that is installed on the base in a swivelable manner; an electric motor for swiveling that causes the swiveling body to swivel; an inverter that supplies electric power to the electric motor for swiveling; a control unit; and an obstacle detector that detects an obstacle around the base and transmits a detected result to the control unit. The method of controlling a shovel provided with an electric swiveling apparatus includes a step of determining in which when the obstacle detector detects an obstacle, the control unit determines whether or not the obstacle is present within a monitoring region, and a step of stopping in which when the obstacle is present inside the monitoring region, the control unit stops the electric motor for swiveling.

Advantageous Effects of Invention

In a case of emergency, an electric-type swiveling body can be halted safely.

DESCRIPTION OF EMBODIMENTS

Embodiment 1

Figure 1:
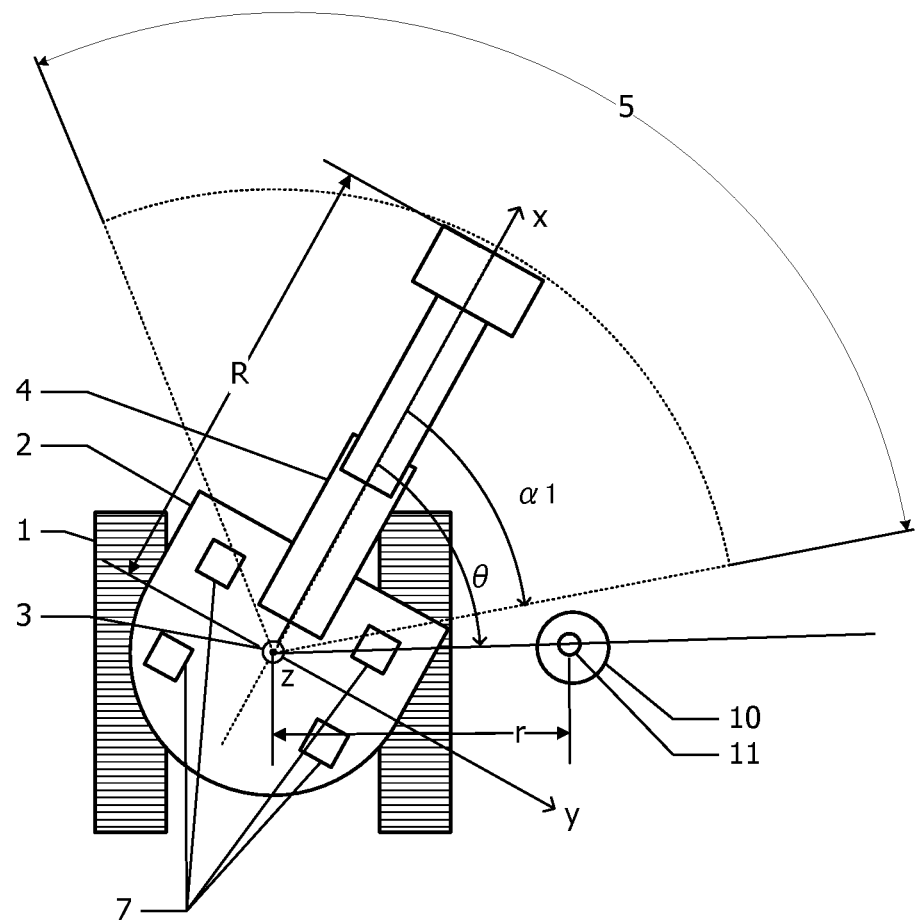
FIG. 1 is a plan view of an electric swiveling apparatus according to Embodiment 1.

FIG. 1 illustrates a plan view of an electric swiveling apparatus according to Embodiment 1. In Embodiment 1, a shovel provided with the electric swiveling apparatus is described, for example. However, this embodiment can be applied to construction machinery that is capable of a swiveling operation in addition to the shovel.

A swiveling body 2 is mounted on a base 1. The base 1 is a traveling body including, for example, crawlers and the like. The swiveling body 2 swivels about a swiveling center 3 with respect to the base 1. An attachment 4 is attached to the swiveling body 2. The attachment 4 swivels about the swiveling center 3 together with the swiveling body 2. In a case where the electric swiveling apparatus is the shovel, the attachment 4 is configured to include a boom, an arm and an excavating bucket, for example.

When the base 1 is placed on a reference horizontal plane, an xyz-rectangular coordinate system is defined in which an azimuth from the swiveling center 3 toward the tip of the attachment 4 is an x-axis, an azimuth perpendicular to the x-axis is a y-axis within the reference horizontal plane, and the swiveling center 3 is a z-axis. An azimuth in which the positive orientation of the x-axis is rotated clockwise by 90° when viewed from above is defined as the positive orientation of the y-axis. In FIG. 1, a left-handed system is employed as the xyz-rectangular coordinate system.

A first monitoring region 5 fans out to be established about the swiveling center 3 (z-axis). A bisector of a central angle of the first monitoring region 5 corresponds to the x-axis.

A distance R between the swiveling center 3 (z-axis) and the tip of the attachment 4 changes in accordance with driving of the boom, the arm and the excavating bucket. Here, the distance R denotes a projected length onto the reference horizontal plane (xy-plane). The distance R is referred to as a "length of the attachment". The radius of the first monitoring region 5 is equal to a length R of the attachment. The half of the central angle of the first monitoring region 5 is referred to as $\alpha1$.

Figure 2:
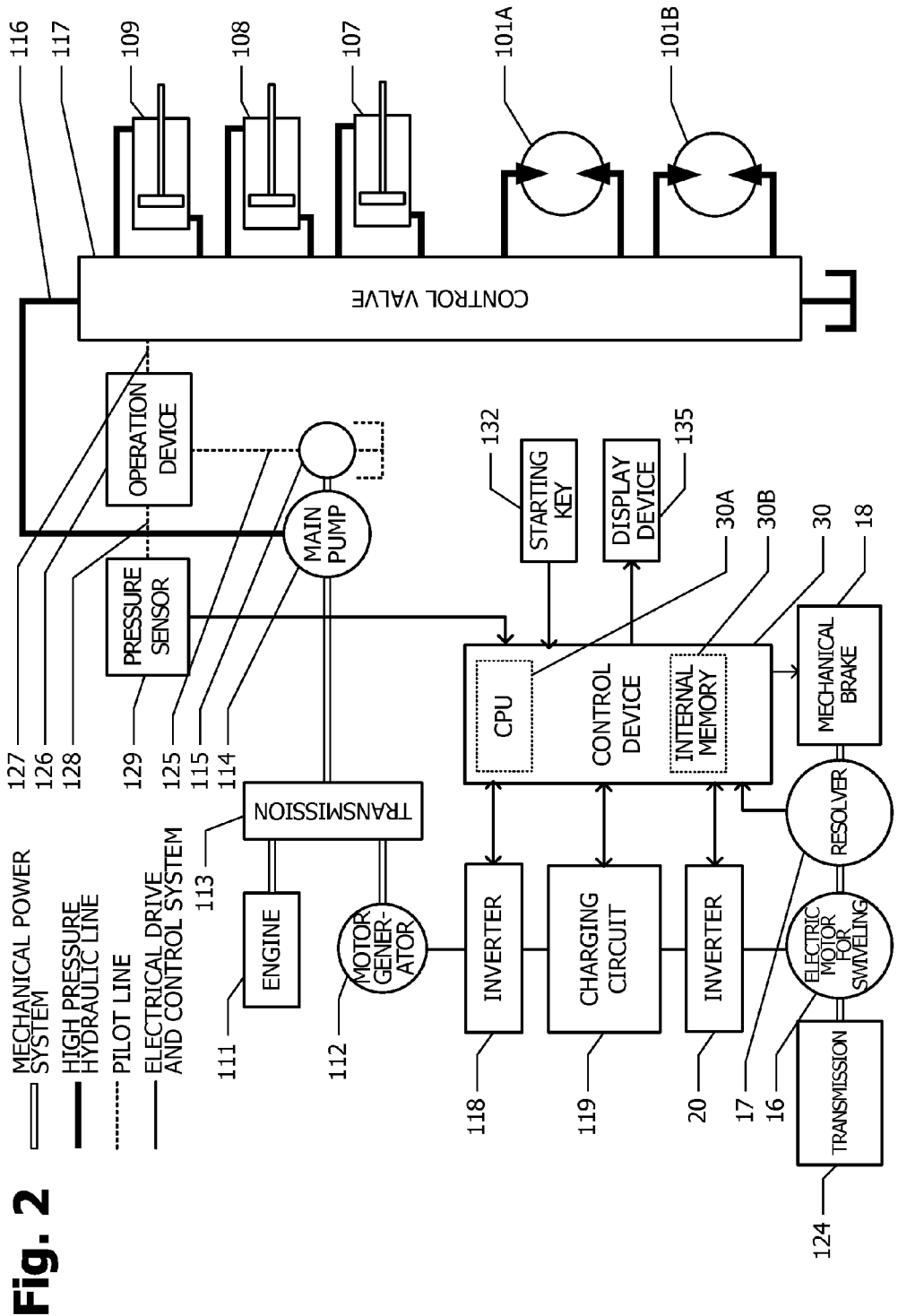
FIG. 2 is a block diagram of the electric swiveling apparatus in its entirety according to Embodiment 1.

FIG. 2 illustrates a block diagram of a hybrid-type shovel in its entirety as an example of the electric swiveling apparatus according to Embodiment 1. In FIG. 2, a mechanical power system is represented with double lines, a high pressure hydraulic line is represented with a bold solid line, an electric system is represented with a thin solid line, and a pilot line is represented with a dotted line.

A drive shaft of an engine 111 is joined to an input shaft of a transmission 113. An engine generating a driving force by fuel other than electricity, for example, an internal-combustion engine such as a diesel engine is employed for the engine 111. The engine 111 is continuously driven while operating a work machine.

A drive shaft of a motor generator 112 is joined to another input shaft of the transmission 113. The motor generator 112 can be operated by both an electric (assist) operation and a power generation operation. For example, an interior permanent magnet type (IPM) motor of which a magnet is embedded inside a rotor is employed for the motor generator 112.

The transmission 113 has two input shafts and one output shaft. A drive shaft of a main pump 114 is joined to the output shaft thereof.

When a load applied to the engine 111 is large, the motor generator 112 performs the assist operation such that the driving force of the motor generator 112 is transferred to the main pump 114 through the transmission 113. Accordingly, the load applied to the engine 111 is reduced. Meanwhile, when the load applied to the engine 111 is small, the driving force of the engine 111 is transferred to the motor generator 112 through the transmission 113 such that the motor generator 112 performs the power generation operation. Switching of the assist operation and the power generation operation in the motor generator 112 are performed by an inverter 118 that is connected to the motor generator 112. The inverter 118 is controlled by a control device 30.

The control device 30 includes a central processing unit (CPU) 30A and an internal memory 30B. The CPU 30A executes a drive-control program that is stored in the internal memory 30B. The control device 30 calls attention of an operator by indicating an emergency level and the like which are described below on a display device 135.

The main pump 114 supplies an oil pressure to a control valve 117 through a high pressure hydraulic line 116. The control valve 117 distributes the oil pressure to hydraulic motors 101A and 101B, a boom cylinder 107, an arm cylinder 108 and an excavating bucket cylinder 109 in accordance with a command from the operator. The hydraulic motors 101A and 101B respectively drive two of left and right crawlers that are provided on the traveling body 1 illustrated in FIG. 1.

An input-output terminal of the electric system in the motor generator 112 is connected to a charging circuit 119 through the inverter 118. The inverter 118 performs an operation control of the motor generator 112 based on a command from the control device 30. Further, an electric motor 16 for swiveling is connected to the charging circuit 119 through another inverter 20. The charging circuit 119 and the inverter 20 are controlled by the control device 30.

While the motor generator 112 is under the assist operation, necessary electric power is supplied from the charging circuit 119 to the motor generator 112 via the inverter 118. While the motor generator 112 is under the power generation operation, the electric power generated by the motor generator 112 is supplied to the charging circuit 119 via the inverter 118.

The electric motor 16 for swiveling is AC driven by a pulse width modulation (PWM) control signal from the inverter 20 such that the electric motor 16 for swiveling can operate both a powering operation and a regenerative operation. For example, the IPM motor is employed for the electric motor 16 for swiveling. The IPM motor generates a great induced-electromotive force at the time of regeneration.

While the electric motor 16 for swiveling is under the powering operation, a rotation force of the electric motor 16 for swiveling is transferred to the swiveling body 2 that is illustrated in FIG. 1 through the transmission 124. In this case, the transmission 124 reduces rotational velocity. Accordingly, the rotational force generated by the electric motor 16 for swiveling is increased and transferred to the swiveling body 2. In addition, at the time of the regenerative operation, a rotational motion of the swiveling body 2 is transferred to the electric motor 16 for swiveling through the transmission 124 such that the electric motor 16 for swiveling generates regenerative electric power. In this case, the transmission 124 steps up the rotational velocity on the contrary to the powering operation. Accordingly, it is possible to increase the number of rotations of the electric motor 16 for swiveling.

A resolver 17 detects a position of a rotation shaft of the electric motor 16 for swiveling in a rotational direction. A detected result is input to the control device 30. The position of the rotation shaft of the electric motor 16 for swiveling in the rotational direction is detected before and after the operation so as to derive a swiveling angle and a swiveling direction.

A mechanical brake 18 is joined to the rotational shaft of the electric motor 16 for swiveling so as to generate a mechanical brake force. A brake state and a release state of the mechanical brake 18 are switched by an electromagnetic switch controlled by the control device 30.

A pilot pump 115 generates pilot pressure that is necessary for a hydraulic operation system. The generated pilot pressure is supplied to an operation device 126 through a pilot line 125. The operation device 126 includes a lever and a pedal, and is operated by the operator. The operation device 126 converts a primary side oil pressure that is supplied from the pilot line 125 into a secondary side oil pressure in accordance with an operation of the operator. The secondary oil pressure is transferred to the control valve 117 through a hydraulic line 127, and transferred to a pressure sensor 129 through another hydraulic line 128.

A detected result of pressure that is detected by the pressure sensor 129 is input to the control device 30. Accordingly, the control device 30 can detect an operation status of the traveling body 1 (FIG. 1), the swiveling body 2 (FIG. 1) and the attachment 4 (FIG. 1) that is configured to include the boom, the arm and the excavating bucket. Particularly in the hybrid-type shovel according to Embodiment 1, the electric motor 16 for swiveling drives the swiveling body 2. Therefore, it is desirable to detect an operation amount of the lever for controlling a swiveling motion of the swiveling body 2 with high accuracy. The control device 30 can detect the operation amount of the lever in high accuracy through the pressure sensor 129.

When the operator turns on a starting key 132, the control device 30 is activated. The control device 30 starts to control the engine 111, the inverters 20 and 118, and the charging circuit 119.

Figure 3:
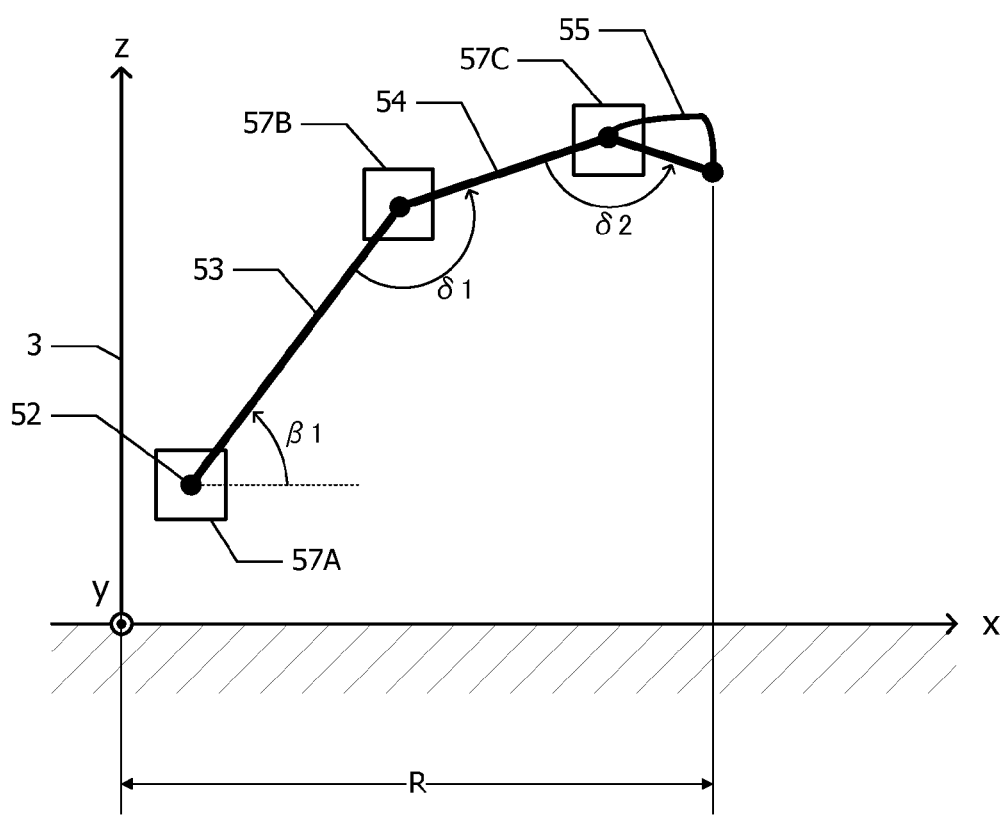
FIG. 3 is a schematic view of a swiveling axis and an attachment to describe a method of calculating a length of the attachment.

A method of calculating the length R of the attachment will be described referring to FIG. 3. A boom 53 swings vertically about a swing center 52 that is parallel to the y-axis. An arm 54 is attached to the tip of the boom 53, and an excavating bucket 55 is attached to the tip the arm 54. Vertical angle sensors 57A, 57B and 57C are respectively attached to a base portion of the boom 53, a connection portion between the boom 53 and the arm 54, and a connection portion between the arm 54 and the excavating bucket 55.

The vertical angle sensor 57A measures an angle $\beta 1$ that is formed by a longitudinal direction of the boom 53 and the reference horizontal plane (xy-plane). The vertical angle sensor 57B measures an angle $\delta 1$ that is formed by the longitudinal direction of the boom 53 and the longitudinal direction of the arm 54. The vertical angle sensor 57C measures an angle $\delta 2$ that is formed by the longitudinal direction of the arm 54 and the longitudinal direction of the excavating bucket 55. Here, the longitudinal direction of the boom 53 denotes a direction of a straight line passing through the swing center 52 and the connection portion between the boom 53 and the arm 54 within a plane (within zx-plane) which is perpendicular to the swing center 52. The longitudinal direction of the arm 54 denotes a direction of the straight line passing through the connection portion between the boom 53 and the arm 54 and the connection portion between the arm 54 and the excavating bucket 55 within the zx-plane. The longitudinal direction of the excavating bucket 55 denotes a direction of the straight line passing through the connection portion between the arm 54 and the excavating bucket 55 and the tip of the excavating bucket 55 within the zx-plane.

The swing center 52 is disposed in a position deviated from the swiveling center 3 (z-axis). The swiveling center 3 and the swing center 52 may be configured to intersect with each other. In other words, an x coordinate of the swing center 52 may be set as zero. The length R of the attachment is determined to the x coordinate of the tip of the excavating bucket 55. The x coordinate of the swing center 52, the length of the boom 53, the length of the arm 54 and the length of the excavating bucket 55 are already known. Therefore, the length R of the attachment can be calculated by measuring the angles $\beta 1$, $\delta 1$ and $\delta 2$.

A plurality of, for example, four obstacle detectors 7 are attached to the swiveling body 2. The obstacle detectors 7 detect an obstacle around the swiveling body 2. A worker, a dump truck or the like can be exemplified as an example of the obstacle. For example, a transmitter 11 is attached to a helmet 10 of the worker. For example, an omnidirectional marker light emitter is employed for the transmitter 11. For example, a CCD camera acquiring an image of the transmitter 11 is employed for the obstacle detector 7. It is possible to calculate a position of the transmitter 11 by imaging one transmitter 11 with a plurality of obstacle detectors 7. Since the obstacle detectors 7 are attached to the swiveling body 2, a relative position of the transmitter 11 with respect to the swiveling body 2 as a reference, that is, a relative position of the obstacle is calculated.

A cabin in which the operator takes a seat is mounted on the swiveling body 2. A swivel lever with which the operator commands the swiveling operation of the swiveling body 2 is installed in the cabin.

Figure 4:
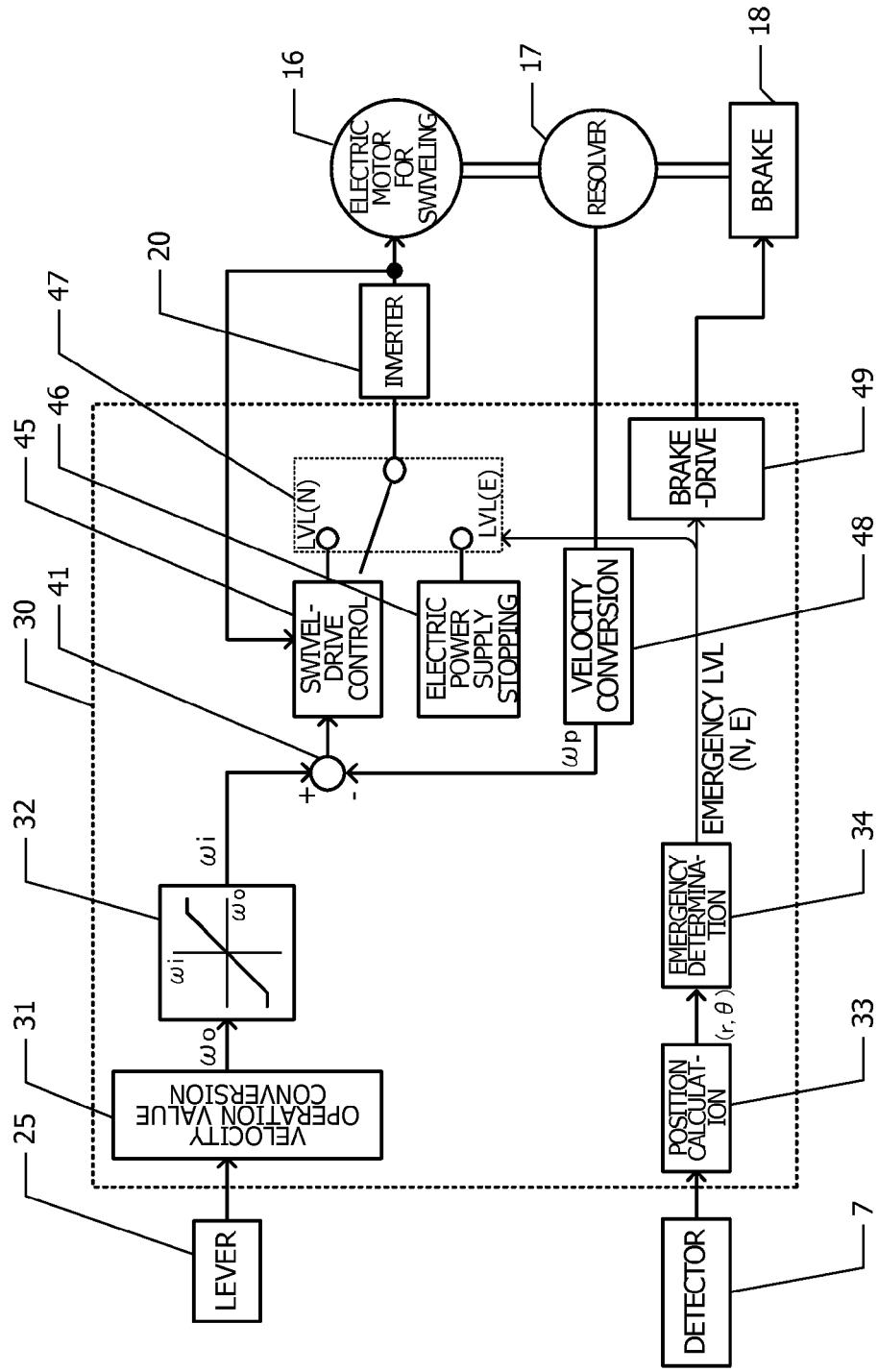
FIG. 4 is a functional block diagram of controlling swiveling of the electric swiveling apparatus according to Embodiment 1.

FIG. 4 illustrates a block diagram of a function of swiveling. The electric motor 16 for swiveling swivels the swiveling body 2 (FIG. 1). For example, the interior permanent magnet type (IPM) motor is employed for the electric motor 16 for swiveling. The inverter 20 supplies drive electric power to the electric motor 16 for swiveling. For example, a pulse width modulation (PWM) type inverter is employed as the inverter 20.

Figure 5:
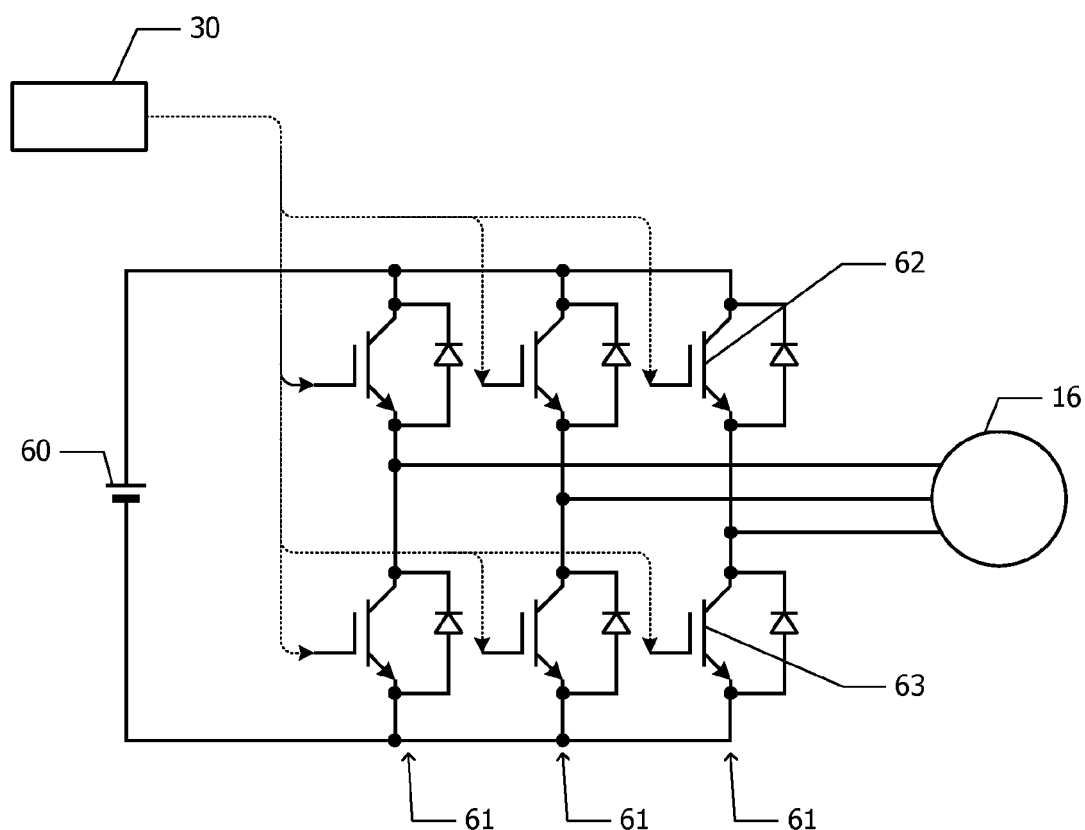
FIG. 5 is an equivalent circuit diagram of an inverter.

FIG. 5 illustrates an example of an equivalent circuit diagram of the inverter 20. The inverter 20 has three half bridge circuits 61 that are connected to DC power source 60. Each half bridge circuit 61 includes a switching element 62 on a cathode side and a switching element 63 on an anode side. The switching elements 62 and 63 are switched to be turned on and off, thereby the drive electric power that is supplied to the electric motor 16 for swiveling is controlled. For example, an insulated gate bipolar transistor (IGBT) is employed for each of the switching elements 62 and 63. Here, the DC power source 60 corresponds to the charging circuit 119 illustrated in FIG. 2.

The control device 30 applies the control signal to the inverter 20. Specifically, a pulse voltage for controlling ON and OFF is applied to a gate terminal of each of the switching elements 62 and 63.

The description will be continued returning back to FIG. 4. The operation amount of the lever is input from a swivel lever 25 to a velocity operation value conversion unit 31 of the control device 30. The velocity operation value conversion unit 31 generates a velocity operation value $\omega o$ in accordance with the input operation amount of the lever. The velocity operation value $\omega o$ is input to a velocity command conversion unit 32. The velocity command conversion unit 32 converts the velocity operation value $\omega o$ into a velocity command value $\omega i$.

Figure 6:
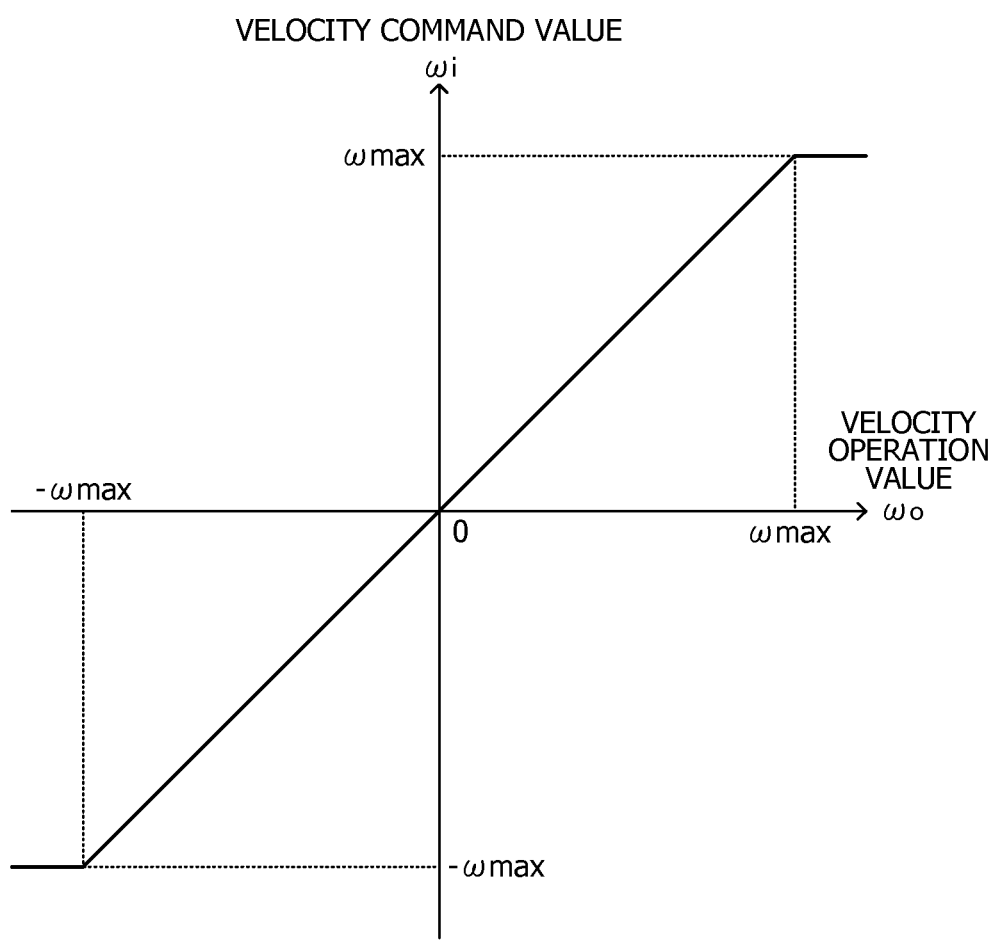
FIG. 6 is a graph illustrating a relationship between a velocity operation value and a velocity command value.

A function of the velocity command conversion unit 32 will be described referring to FIG. 6. FIG. 6 illustrates a relationship between the velocity operation value $\omega o$ and the velocity command value $\omega i$. The horizontal axis indicates the velocity operation value $\omega o$ and the vertical axis indicates the velocity command value $\omega i$. Regarding the swiveling velocity, clockwise swiveling direction is defined as positive, and counterclockwise swiveling direction is defined as negative. When the absolute value of the velocity operation value ωo is equal to or less than the maximum velocity ωmax, ωi=ωo. If the absolute value of the velocity operation value ωo is equal to or more than ωmax, ωi=ωmax. That is, the velocity command value ωi is generated such that the absolute value of the velocity command value ωi does not exceed the maximum velocity ωmax. The velocity command value ωi is input to a non-inverted input terminal of a comparator 41.

The description will be continued returning back to FIG. 4. Detected signals of the obstacle detectors 7 are input to a position calculation unit 33 of the control device 30. The position calculation unit 33 analyzes the detected signals that are input to obtain a position of the obstacle. In the xyz-rectangular coordinate system illustrated in FIG. 1, for example, the position of the obstacle is expressed by a distance r between the origin and the obstacle, and by an azimuth angle θ in which an azimuth of x-axis is set as 0°. The coordinates (r, θ) are a relative position with respect to the attachment 4 of the swiveling body 2 as a reference. Since the detectors 7 are mounted on the swiveling body 2, even if the swiveling body 2 swivels, it is possible to directly calculate the azimuth angle θ through the detectors 7. The obtained positional coordinates (r, θ) of the obstacle is input to an emergency determination unit 34.

The emergency determination unit 34 determines emergency level based on the input coordinates (r, θ) of the obstacle. If the obstacle is present inside the first monitoring region 5 illustrated in FIG. 1, the emergency level is set to a level E. If the obstacle is not present inside the first monitoring region 5, the emergency level is set to a level N.

The resolver 17 detects a position of the electric motor 16 for swiveling in the swiveling direction, and inputs the detected result to a velocity conversion unit 48. The velocity conversion unit 48 converts the position in the swiveling direction into the swiveling velocity, and inputs a current swiveling velocity ωp to an inverted input terminal of the comparator 41.

The comparator 41 obtains a difference between the velocity command value ωi that is input to the non-inverted input terminal and the current swiveling velocity ωp, and inputs the difference therebetween to a swivel-drive control unit 45. An output of the inverter 20 is fed back to the swivel-drive control unit 45.

The swivel-drive control unit 45 generates the control signal of the inverter 20 based on the input difference and the output of the inverter 20 that is fed back. Specifically, the swivel-drive control unit 45 generates the control signal of the inverter 20 so that the current swiveling velocity ωp approaches the velocity command value ωi. The generated control signal is input to one of input terminals of a second switching unit 47.

An electric power supply stopping signal generation unit 46 generates a control signal for stopping electric power supply from the inverter 20 to the electric motor 16 for swiveling. Specifically, a control signal is generated so as to turn off all the switching elements 62 and 63 of the inverter 20 illustrated in FIG. 5.

The second switching unit 47 selects one of the control signal output from the swivel-drive control unit 45 and the control signal output from the electric power supply stopping signal generation unit 46 to input the selected one to the inverter 20. When the emergency level is designated as the level N, the control signal output from the swivel-drive control unit 45 is input to the inverter 20. When the emergency level is designated as the level E, the control signal output from the electric power supply stopping signal generation unit 46 is input to the inverter 20. In this way, the electric motor 16 for swiveling is controlled in accordance with the emergency level.

A brake-drive unit 49 controls the mechanical brake 18. When the emergency level is designated as the level E, the brake-drive unit 49 operates the mechanical brake 18, and applies the brake force to the electric motor 16 for swiveling. In this way, the mechanical brake 18 is controlled in accordance with the emergency level.

Each function of the control device 30 may be realized through hardware, or may be realized through software for a computer.

Figure 7:
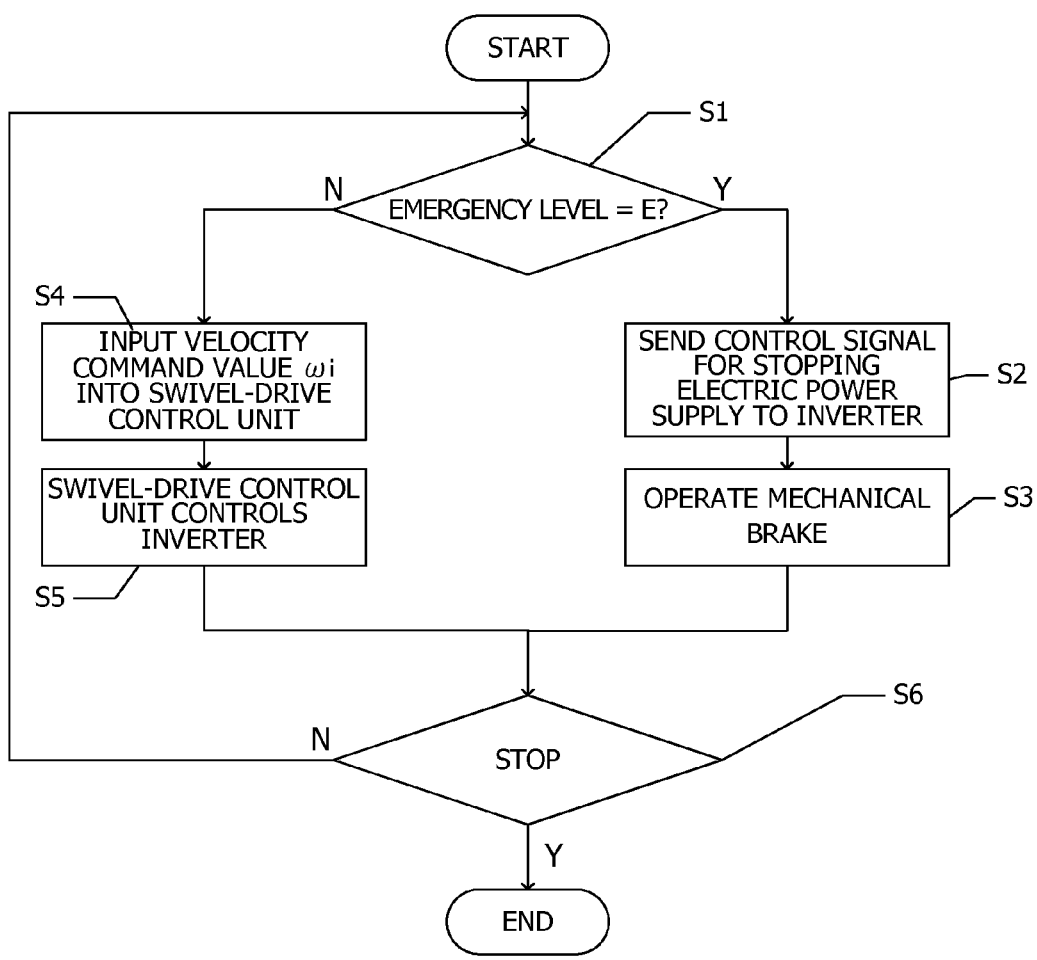
FIG. 7 is a flow chart of controlling the swiveling according to Embodiment 1.

FIG. 7 illustrates a flow chart of a method of controlling swiveling of the electric swiveling apparatus according to Embodiment 1. In step S1, it is determined whether or not the emergency level is designated as the level E. When the emergency level is designated as the level E, that is, the obstacle is detected within the first monitoring region 5 of FIG. 1, the second switching unit 47 illustrated in FIG. 4 selects the electric power supply stopping signal generation unit 46. In step S2, the control signal for stopping the electric power supply is sent to the inverter 20. The supply of electric power from the inverter 20 to the electric motor 16 for swiveling is stopped. In step S3, the brake-drive unit 49 operates the brake 18. Instead, chronological order of steps S2 and S3 may be reversed, or two steps may be executed at the same time.

The supply of electric power to the electric motor 16 for swiveling is stopped, and the brake force is applied from the brake 18 such that the swiveling velocity of the swiveling body 2 (FIG. 1) is decreased rapidly, and the swiveling body 2 can be stopped immediately.

After executing step S3, an operation state of the electric swiveling apparatus is determined in step S6. If an operation of the electric swiveling apparatus is not stopped, the process returns back to step S1.

In step S1, if it is determined that the emergency level is not designated as the level E, that is, if the emergency level is designated as the level N, the second switching unit 47 illustrated in FIG. 4 selects the swivel-drive control unit 45. Accordingly, in step S4, the velocity command value ωi is input to the non-inverted input terminal of the comparator 41. In step S5, the control signal output from the swivel-drive control unit 45 is input to the inverter 20.

As illustrated in FIG. 6, if the velocity operation value ωo on the basis of the operation amount of the swivel lever by the operator is equal to or less than the maximum velocity ωmax, the inverter 20 is controlled such that the swiveling velocity becomes the velocity operation value ωo. If the velocity operation value ωo exceeds the maximum velocity ωmax, the inverter 20 is controlled such that the swiveling velocity becomes equal to the maximum velocity ωmax. In this way, the swiveling velocity is regulated to the maximum velocity ωmax.

After executing step S5, the operation state of the electric swiveling apparatus is determined in step S6. If the operation of the electric swiveling apparatus is not stopped, the process returns back to step S1.

In Embodiment 1, when the emergency level is designated as the level E, the supply of the electric power to the electric motor 16 for swiveling is stopped regardless of the operation by the operator, and the mechanical brake 18 is operated, thereby stopping the swiveling operation of the swiveling body 2 automatically and forcibly. Therefore, the attachment 4 can be prevented from coming into contact with the obstacle.

Embodiment 2

Figure 8:
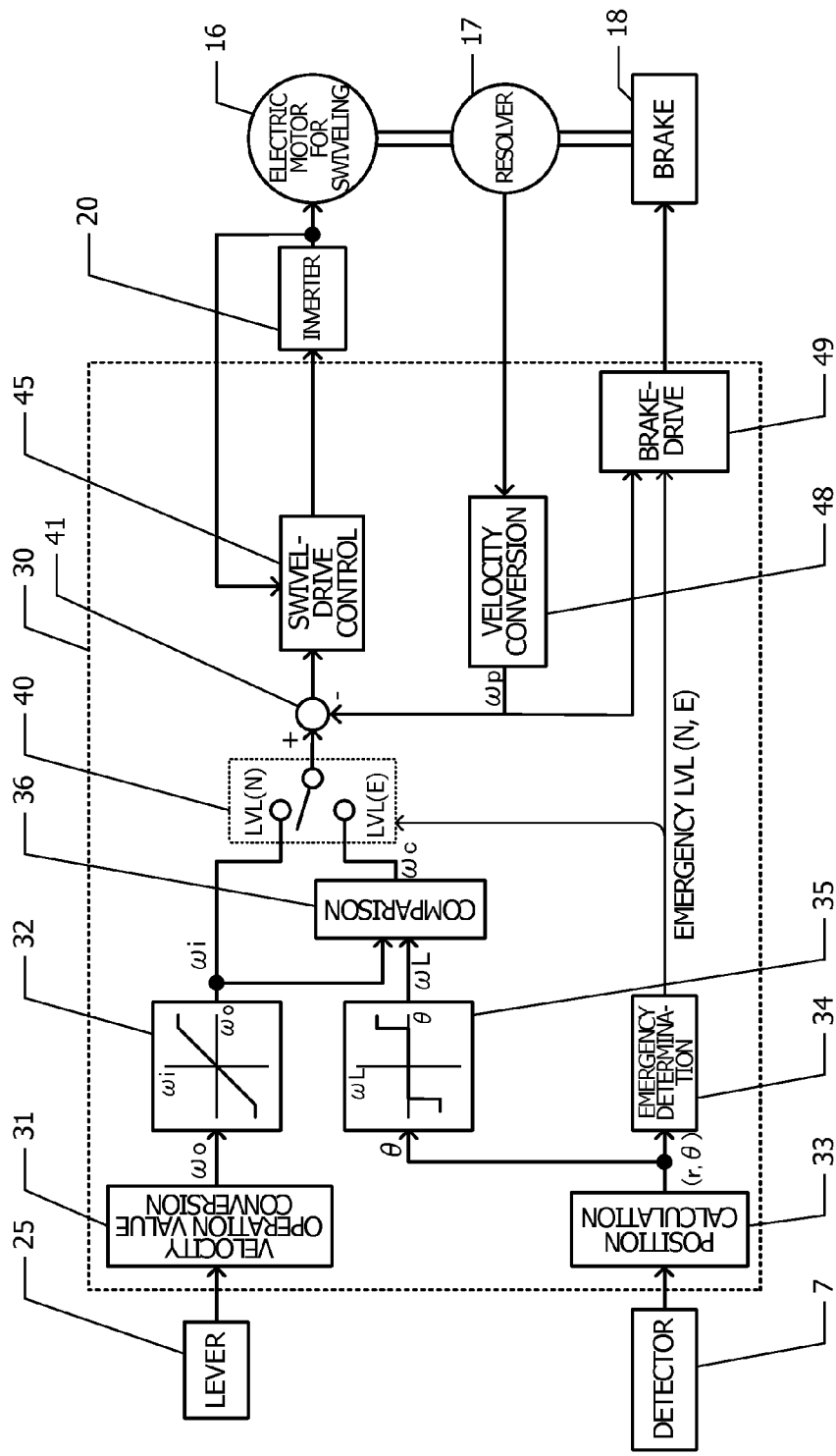
FIG. 8 is a functional block diagram of controlling the swiveling of an electric swiveling apparatus according to Embodiment 2.

FIG. 8 illustrates a block diagram of a function of swiveling of the electric swiveling apparatus according to Embodiment 2. Hereinafter, the description will be given focusing on a difference from the function of swiveling according to Embodiment 1 illustrated in FIG. 4, and the description for the same function will not be repeated. As contrasting FIG. 8 with FIG. 4, a regulation velocity operation unit 35, a comparing unit 36 and a first switching unit 40 are added, and the electric power supply stopping signal generation unit 46 and the second switching unit 47 of FIG. 4 are eliminated.

Figure 9:
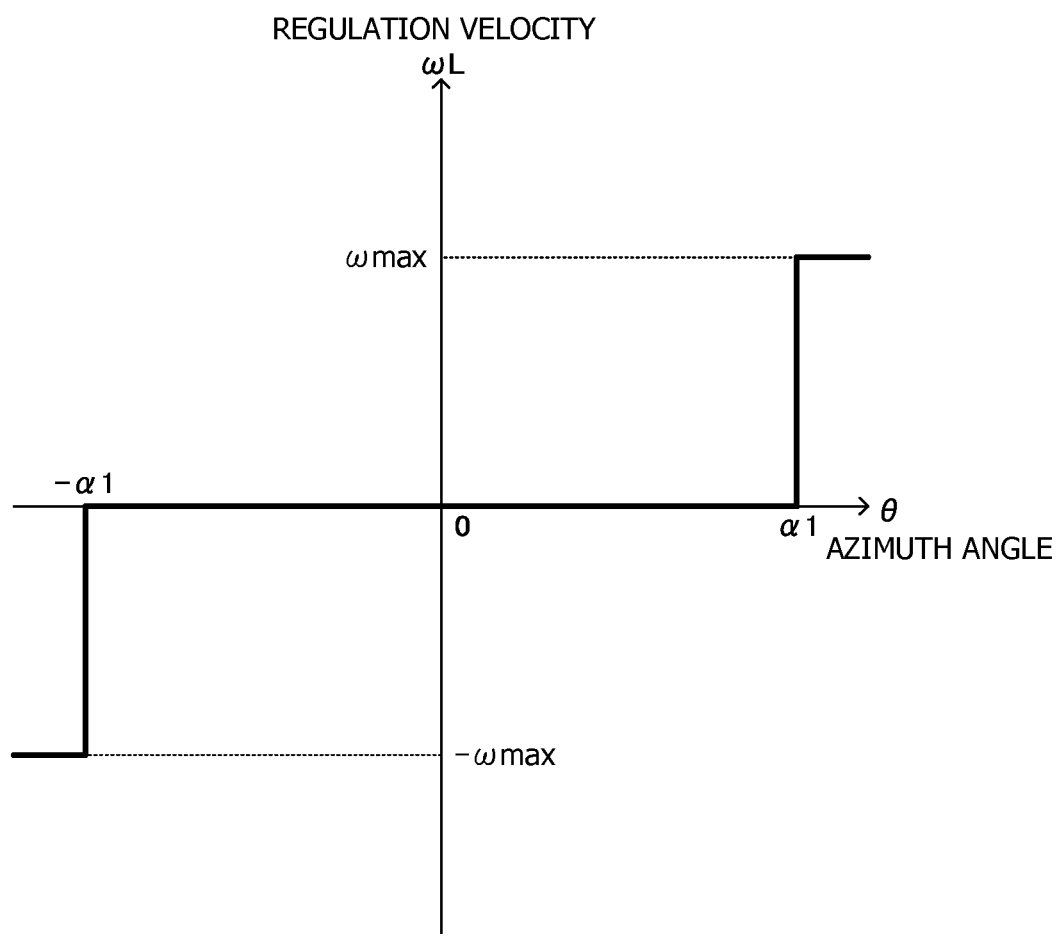
FIG. 9 is a graph illustrating a relationship between an azimuth angle of a position of an obstacle, and regulation velocity.

A function of the regulation velocity operation unit 35 will be described referring to FIG. 9. FIG. 9 illustrates a relationship between the azimuth angle $\theta$ of the position where the obstacle is detected and a regulation velocity $\omega L$. The horizontal axis indicates the azimuth angle $\theta$ and the vertical axis indicates the regulation velocity $\omega L$. When the absolute value of the azimuth angle $\theta$ is equal to or less than half of the central angle (angle $\alpha 1$) of the first monitoring region 5 (FIG. 1), the regulation velocity $\omega L$ is set as zero. When the absolute value of the azimuth angle $\theta$ is greater than $\alpha 1$, the regulation velocity $\omega L$ is set as $\omega$max (FIG. 6).

The velocity command value (second command value) $\omega i$ and the regulation velocity $\omega L$ are input to the comparing unit 36. The comparing unit 36 compares the velocity command value $\omega i$ and the regulation velocity $\omega L$, and outputs the smaller velocity thereof as an emergency command value (first command value) $\omega c$. Specifically, when the velocity command value $\omega i$ is smaller than the regulation velocity $\omega L$, the emergency command value $\omega c$ is set to a value of the velocity command value $\omega i$. When the velocity command value $\omega i$ is equal to or greater than the regulation velocity $\omega L$, the emergency command value $\omega c$ is set to a value of the regulation velocity $\omega L$.

One out of the velocity command value $\omega i$ and the emergency command value $\omega c$ is selected by the first switching unit 40, and input to the non-inverted input terminal of the comparator 41. The first switching unit 40 selects the velocity command value $\omega i$ when the emergency level determined by the emergency determination unit 34 is designates as the level N, and selects the emergency command value $\omega c$ when the emergency level is designated as the level E.

The emergency level being designated as the level E denotes that the azimuth angle $\theta$ (FIG. 1) is equal to or less than $\alpha 1$. Therefore, the regulation velocity $\omega L$ that is output from the regulation velocity operation unit 35 is zero. The emergency command value $\omega c$ that is output from the comparing unit 36 also becomes zero. When the emergency level is designated as the level E, the emergency command value $\omega c$ that is input to the non-inverted input terminal of the comparator 41 is zero. In this case, the swivel-drive control unit 45 supplies a drive signal to the inverter 20 such that the rotational velocity of the electric motor 16 for swiveling becomes zero. In this case, electric brake torque is applied to the electric motor 16 for swiveling.

The current swiveling velocity $\omega p$ is input from the velocity conversion unit 48 to the mechanical brake-drive unit 49. The mechanical brake-drive unit 49 operates the mechanical brake 18 when the emergency level is designated as the level E and the swiveling velocity $\omega p$ is zero.

Figure 10:
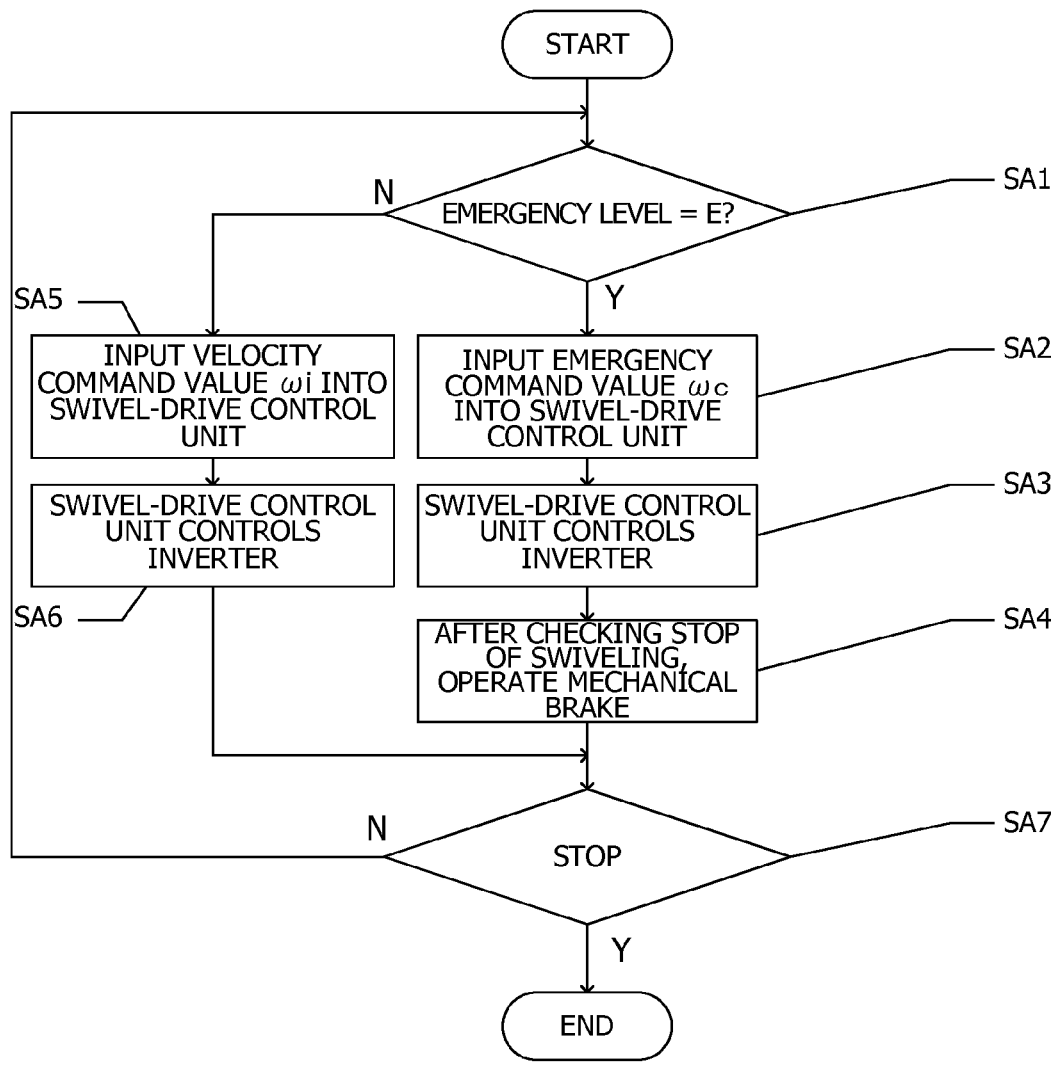
FIG. 10 is a flow chart of controlling the swiveling according to Embodiment 2.

FIG. 10 illustrates a flow chart of a method of controlling the swiveling of the electric swiveling apparatus according to Embodiment 2. In step SA1, it is determined whether or not the emergency level is designated as the level E. When the emergency level is designated as the level E, in step SA2, the emergency command value $\omega c$=0 is input to the swivel-drive control unit 45. In step SA3, the swivel-drive control unit 45 transmits the control signal to the inverter 20 such that the swiveling velocity of the swiveling body 2 becomes zero. Accordingly, the electric brake torque is added to the electric motor 16 for swiveling, and thus, it is possible to halt the swiveling body 2 more quickly compared to a case of only stopping the electric power supply.

In step SA4, after checking that the swiveling body 2 is halted, the mechanical brake 18 is operated. In step SA7, the operation state of the electric swiveling apparatus is determined. If the operation of the electric swiveling apparatus is not stopped, the process returns back to Step SA1.

If it is determined that the emergency level is not designated as the level E in step SA1, that is, if the emergency level is designated as the level N, the velocity command value $\omega i$ is input to the swivel-drive control unit 45 in step SA5. In step SA6, the swivel-drive control unit 45 transmits the control signal to the inverter 20 such that the swiveling velocity of the swiveling body 2 becomes $\omega i$. Thereafter, in step SA7, the operation state of the electric swiveling apparatus is determined. If the operation of the electric swiveling apparatus is not stopped, the process returns back to Step SA1.

Figure 11:
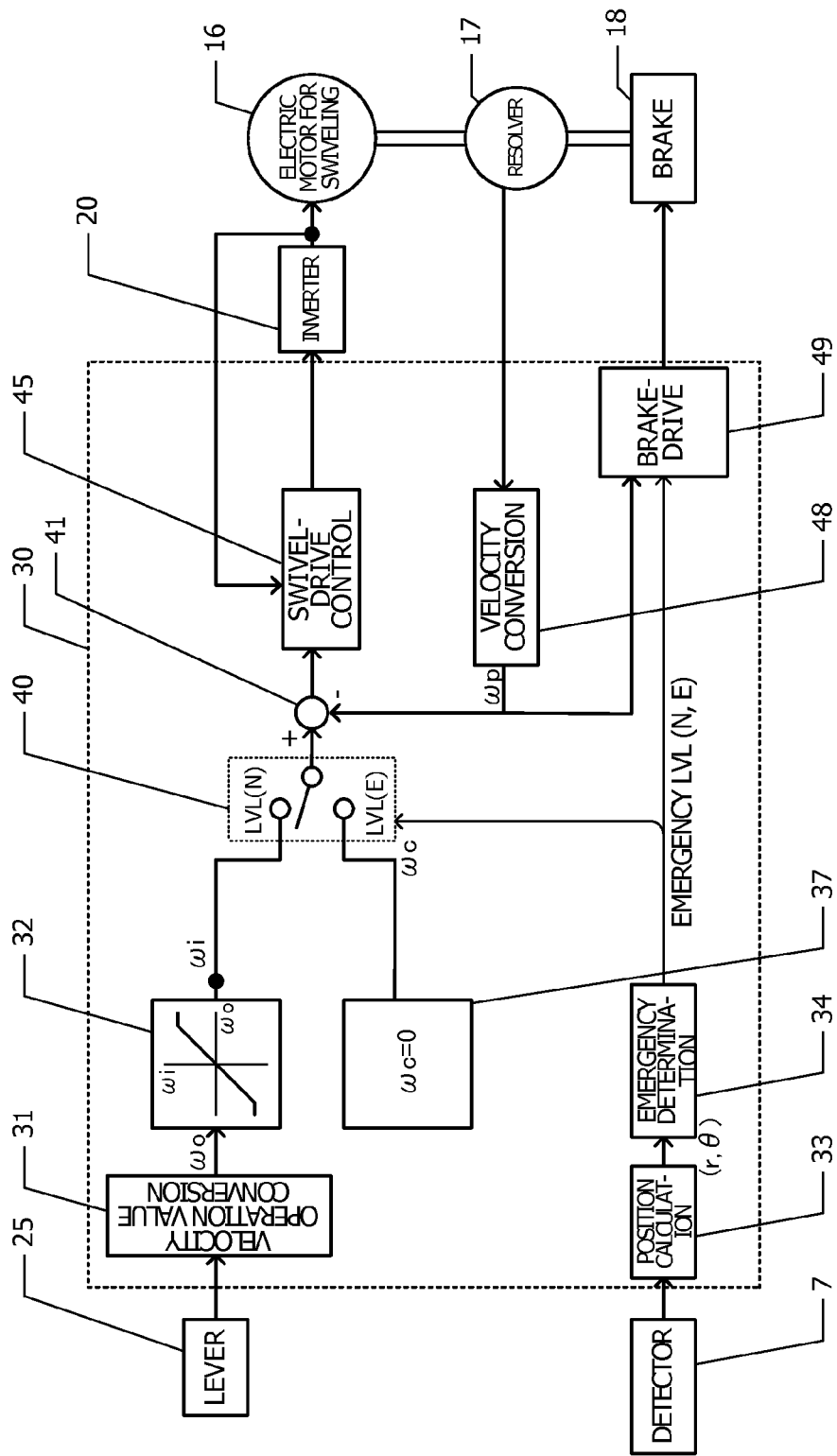
FIG. 11 is a functional block diagram of controlling the swiveling of the electric swiveling apparatus according to a modification of Embodiment 2.

FIG. 11 illustrates a block diagram of a function of swiveling of the electric swiveling apparatus according to a modification of Embodiment 2. Hereinafter, the description will be given focusing on a difference from the function of swiveling according to Embodiment 2 illustrated in FIG. 8, and the description for the same function will not be repeated.

In the modification, in place of the regulation velocity operation unit 35 and the comparing unit 36 in FIG. 8, a regulation velocity generation unit 37 is provided. The regulation velocity generation unit 37 constantly outputs the emergency command value $\omega c$=0. The velocity command value $\omega i$ is input to one input terminal of the first switching unit 40, and the emergency command value $\omega c$=0 is input to the other input terminal.

In the modification, when the emergency level is designated as the level E, the emergency command value $\omega c$=0 is input to the non-inverted input terminal of the comparator 41. Therefore, the same operation as Embodiment 2 is realized.

Embodiment 3

The electric swiveling apparatus according to Embodiment 3 will be described referring to FIGS. 12 to 15. Hereinafter, the description will be given focusing on a difference from Embodiment 1, and the description for the same function will not be repeated.

Figure 12:
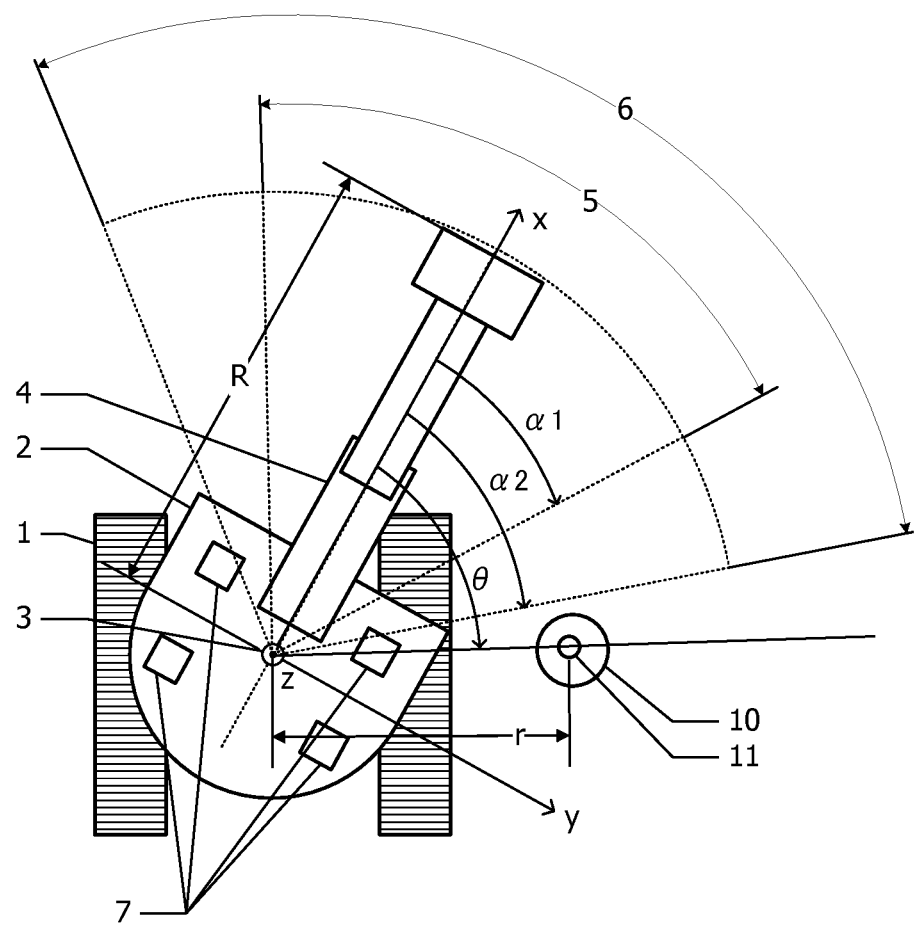
FIG. 12 is a plan view of an electric swiveling apparatus according to Embodiment 3.

FIG. 12 illustrates a plan view of the electric swiveling apparatus according to Embodiment 3. The first monitoring region 5 is established in Embodiment 1. In Embodiment 3, a second monitoring region 6 is established in addition to the first monitoring region 5. Similar to the first monitoring region 5, the second monitoring region 6 having the radius R fans out about the swiveling center 3 (z-axis), and the bisector of the central angle corresponds to the x-axis. The half of the central angle of the second monitoring region 6 is referred to as $\alpha 2$. The angle $\alpha 2$ is greater than the angle $\alpha 1$.

Figure 13:
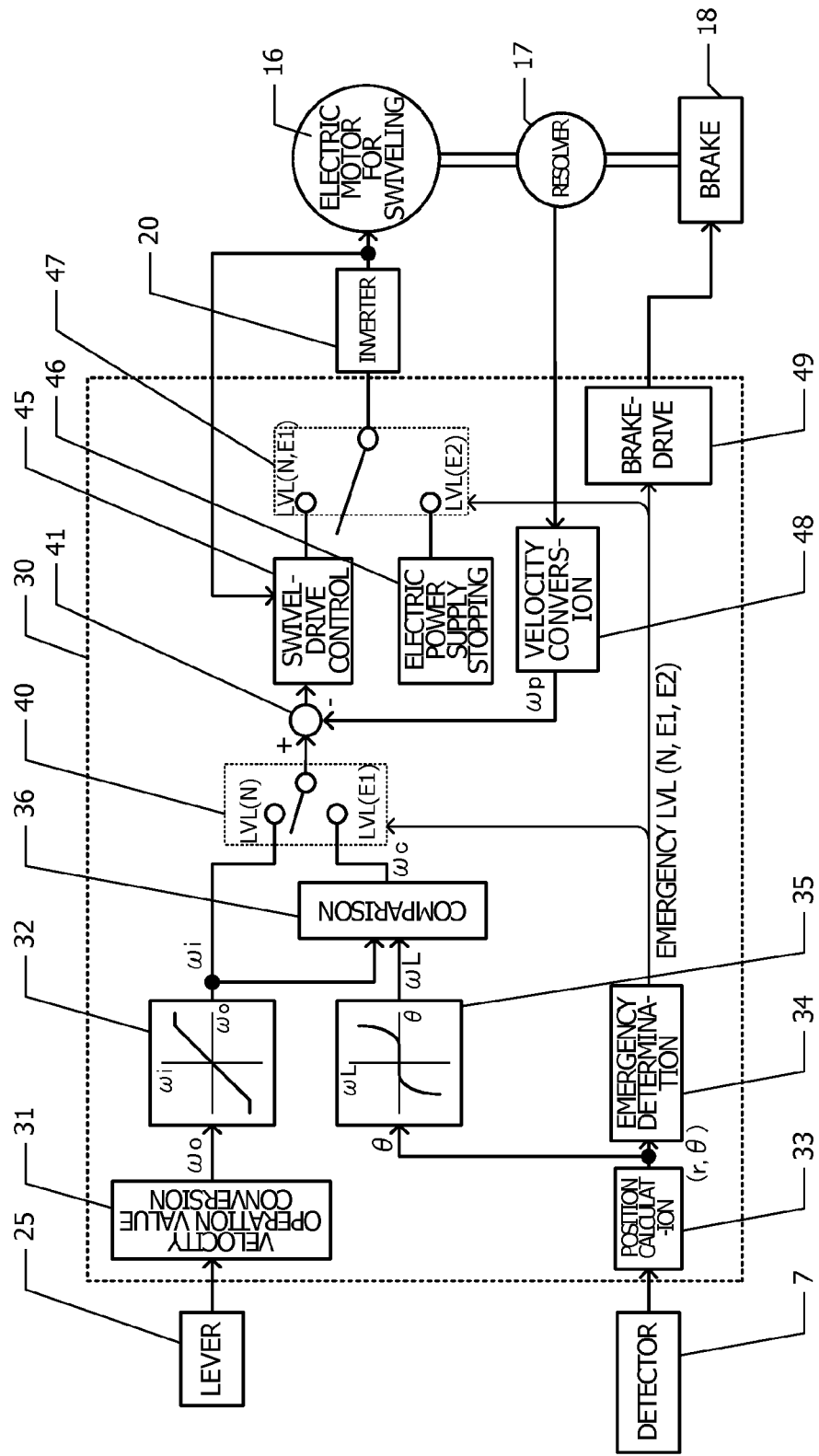
FIG. 13 is a functional block diagram of controlling the swiveling of the electric swiveling apparatus according to Embodiment 3.

FIG. 13 illustrates a block diagram of a function of swiveling. The azimuth angle $\theta$ obtained by the position calculation unit 33 is input to the regulation velocity operation unit 35. The regulation velocity operation unit 35 calculates the regulation velocity based on the input azimuth angle $\theta$ of the obstacle. A function of the regulation velocity operation unit 35 will be described referring to FIG. 14.

Figure 14:
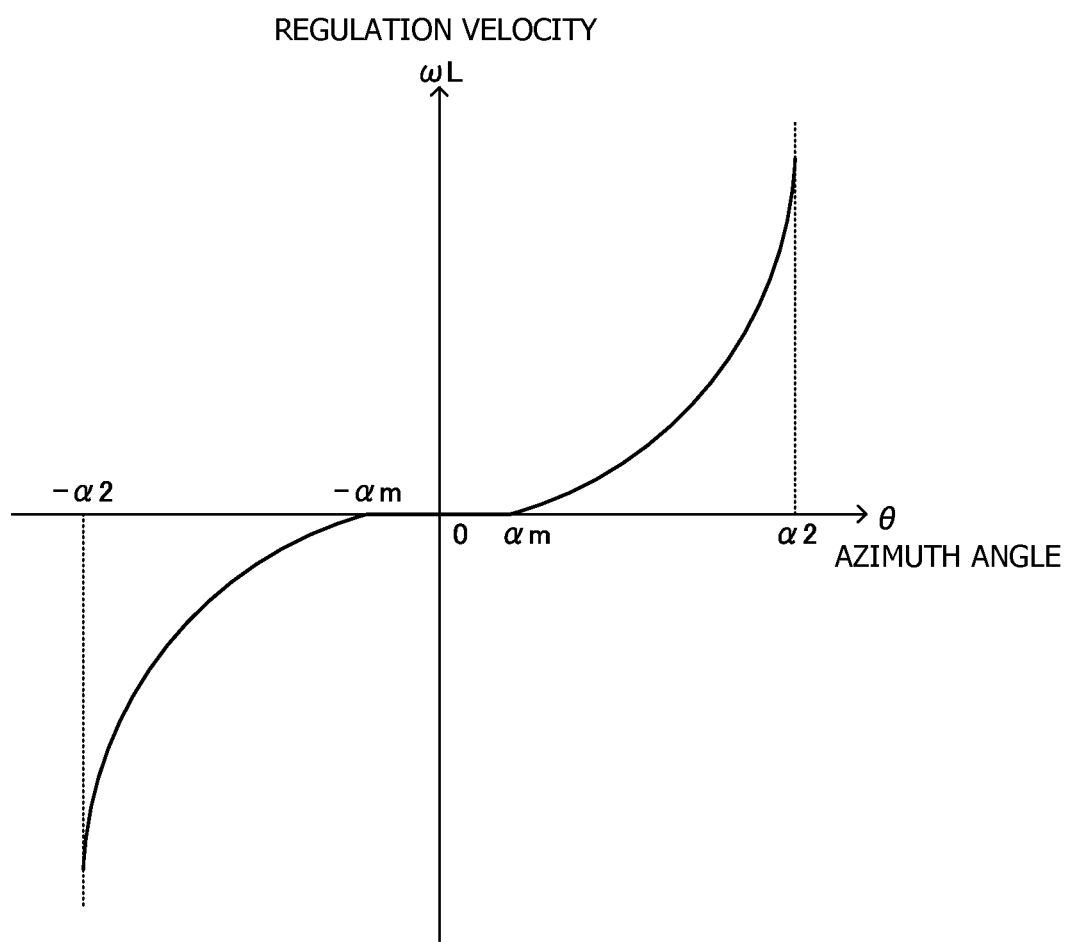
FIG. 14 is a graph illustrating a relationship between an azimuth angle of a position of an obstacle and regulation velocity.

FIG. 14 illustrates a relationship between the azimuth angle $\theta$ of a position where the obstacle is detected and the regulation velocity $\omega L$. The horizontal axis indicates the azimuth angle $\theta$ and the vertical axis indicates the regulation velocity $\omega L$. When the absolute value of the azimuth angle $\theta$ is equal to or less than half of the central angle (angle $\alpha 2$) of the second monitoring region 6, the absolute value of the regulation velocity ωL is decreased monotonically as the absolute value of the azimuth angle θ is decremented. When the absolute value of the azimuth angle θ is αm, the regulation velocity ωL becomes zero. In a region where the absolute value of the azimuth angle θ is between zero and αm, the regulation velocity ωL is zero. In this way, the regulation velocity operation unit 35 functions as a regulation unit suppressing the regulation velocity ωL based on a pattern (relationship between the azimuth angle θ of a position where the obstacle is detected and the regulation velocity ωL) set in advance. Accordingly, the regulation velocity operation unit 35 generates the regulation velocity ωL on the basis of the input azimuth angle θ, and the relationship between the azimuth angle θ and the regulation velocity ωL which are illustrated in FIG. 14.

The velocity command value ωi and the regulation velocity ωL are input to the comparing unit 36. The comparing unit 36 compares the velocity command value ωi and the regulation velocity ωL, and outputs the smaller velocity thereof as an emergency command value ωc.

The emergency determination unit 34 determines emergency level based on the input coordinates (r, θ) of the obstacle. If the obstacle is present inside the second monitoring region 6 illustrated in FIG. 1 and is present outside the first monitoring region 5, the emergency level is designated as a level E1. If the obstacle is present inside the first monitoring region 5, the emergency level is designated as a level E2. In other cases, the emergency level is designated as the level N.

One out of the velocity command value ωi and the emergency command value ωc is selected by the first switching unit 40, and input to the non-inverted input terminal of the comparator 41. The first switching unit 40 selects the velocity command value ωi when the emergency level is designated as the level N, and selects the emergency command value ωc when the emergency level is designated as the level E1. When the emergency level is designated as the level E2, the first switching unit 40 is in a neutral state. Therefore, no signal is input to the non-inverted input terminal of the comparator 41.

The second switching unit 47 selects one out of the control signal that is output from the swivel-drive control unit 45 and the control signal that is output from the electric power supply stopping signal generation unit 46 and inputs the selected one to the inverter 20. When the emergency level is designated as the level N or the level E1, the control signal output from the swivel-drive control unit 45 is input to the inverter 20. When the emergency level is designated as the level E2, the control signal output from the electric power supply stopping signal generation unit 46 is input to the inverter 20.

Figure 15:
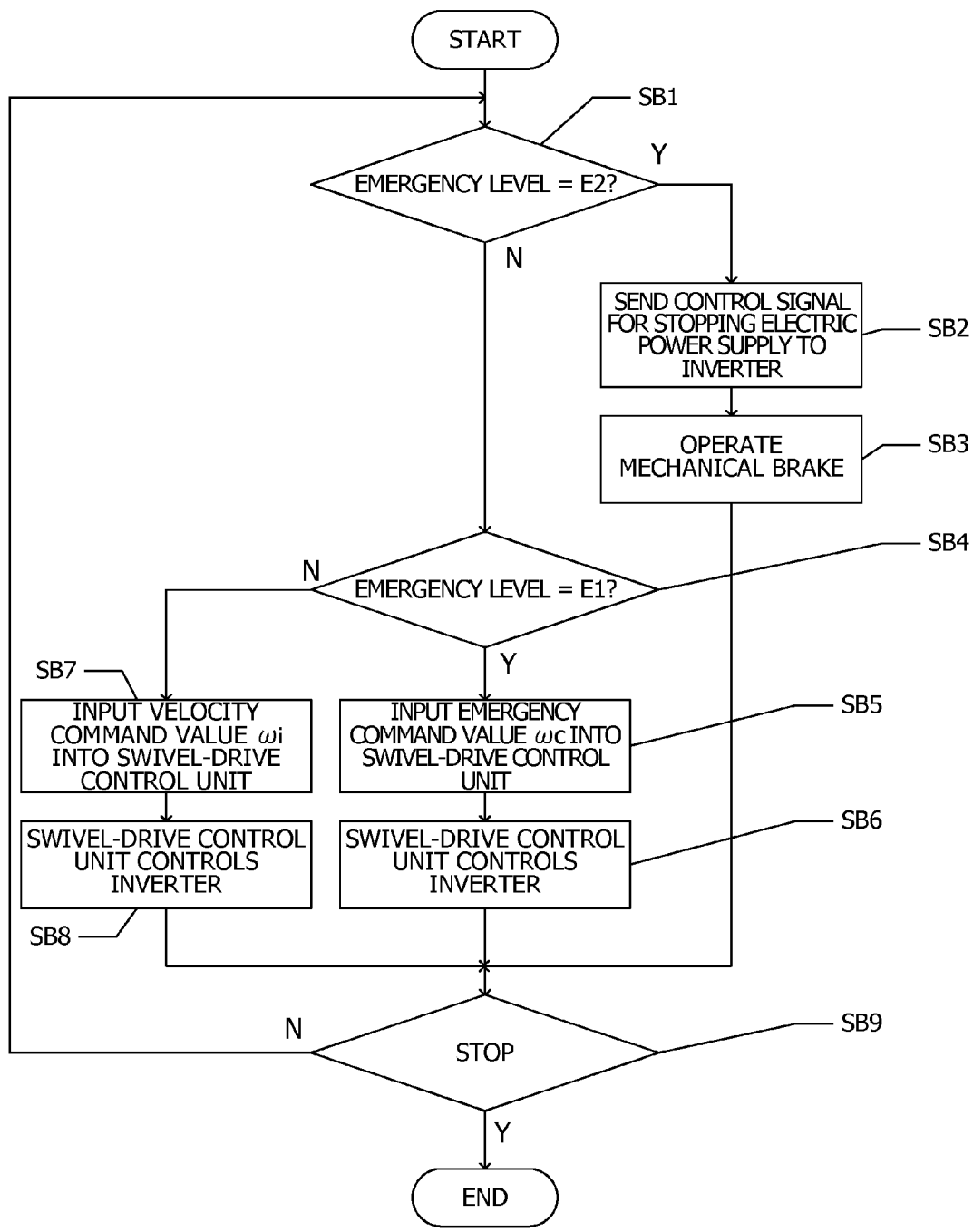
FIG. 15 is a flow chart of controlling the swiveling according to Embodiment 3.

FIG. 15 illustrates a flow chart of a method of controlling the swiveling of the electric swiveling apparatus according to Embodiment 3. In step SB1, it is determined whether or not the emergency level is designated as the level E2. When the emergency level is designated as the level E2, that is, the obstacle is detected within the first monitoring region 5 of FIG. 12, the second switching unit 47 illustrated in FIG. 13 selects the electric power supply stopping signal generation unit 46. In step SB2, the control signal for stopping the electric power supply is sent to the inverter 20. The supply of electric power from the inverter 20 to the electric motor 16 for swiveling is stopped. In step SB3, the brake-drive unit 49 operates the brake 18. Instead, the chronological order of steps SB2 and SB3 may be reversed, or two steps may be executed at the same time.

The supply of electric power to the electric motor 16 for swiveling is stopped, and the brake force is applied from the brake 18 such that the swiveling velocity of the swiveling body 2 (FIG. 12) is decreased rapidly, and the swiveling body 2 can be stopped immediately.

After executing step SB3, the operation state of the electric swiveling apparatus is determined in step SB9. If the operation of the electric swiveling apparatus is not stopped, the process returns back to step SB1.

In step SB1, if it is determined that the emergency level is not designated as the level E2, in step SB4, it is determined whether or not the emergency level is designated as the level E1. If the emergency level is designated as the level E1, that is, if the obstacle is detected inside the second monitoring region 6 illustrated in FIG. 12 and detected outside the first monitoring region 5, the first switching unit 40 illustrated in FIG. 13 selects the emergency command value ωc, and the second switching unit 47 selects the swivel-drive control unit 45. Accordingly, in step SB5, the emergency command value ωc is input to the non-inverted input terminal of the comparator 41, and the control signal output from the swivel-drive control unit 45 is input to the inverter 20 in step SB6.

As illustrated in FIG. 14, an upper limit value of the swiveling velocity is regulated to the regulation velocity ωL depending on the azimuth angle θ of a position of the obstacle. Even if the operator operates the swivel lever to command the swiveling apparatus to swivel in higher velocity than the regulation velocity ωL, the swiveling velocity is suppressed to the regulation velocity ωL. Therefore, without stopping the operation, it is possible to avoid sudden approach toward the obstacle.

After executing step SB6, the operation state of the electric swiveling apparatus is determined in step SB9. If the operation of the electric swiveling apparatus is not stopped, the process returns back to step SB1.

In step SB4, if it is determined that the emergency level is not designated as the level E1, the first switching unit 40 illustrated in FIG. 13 selects the velocity command value ωi, and the second switching unit 47 selects the swivel-drive control unit 45. Accordingly, in step SB7, the velocity command value ωi is input to the non-inverted input terminal of the comparator 41. In step SB8, the control signal output from the swivel-drive control unit 45 is input to the inverter 20.

If the velocity operation value ωo illustrated in FIG. 6 corresponding to the operation of the swivel lever by the operator is equal to or less than the maximum velocity ωmax, the inverter 20 is controlled such that the swiveling velocity becomes the velocity operation value ωo. If the velocity operation value ωo exceeds the maximum velocity ωmax, the inverter 20 is controlled such that the swiveling velocity becomes equal to the maximum velocity ωmax.

After executing step SB8, the operation state of the electric swiveling apparatus is determined in step SB9. If the operation of the electric swiveling apparatus is not stopped, the process returns back to step SB1.

In Embodiment 3, when the emergency level is designated as the level E2, the swiveling operation of the swiveling body 2 is forcibly stopped regardless of the operation by the operator. Therefore, the attachment 4 can be prevented from coming into contact with the obstacle. In addition, when the emergency level is designated as the level E1, the inverter 20 is controlled such that the swiveling velocity becomes equal to or less than the regulation velocity ωL. Therefore, when the emergency level is designated as the level E2, it is possible to reduce a swiveling angle (brake angle) of the swiveling body 2 for stopping.

Embodiment 4

Figure 16:
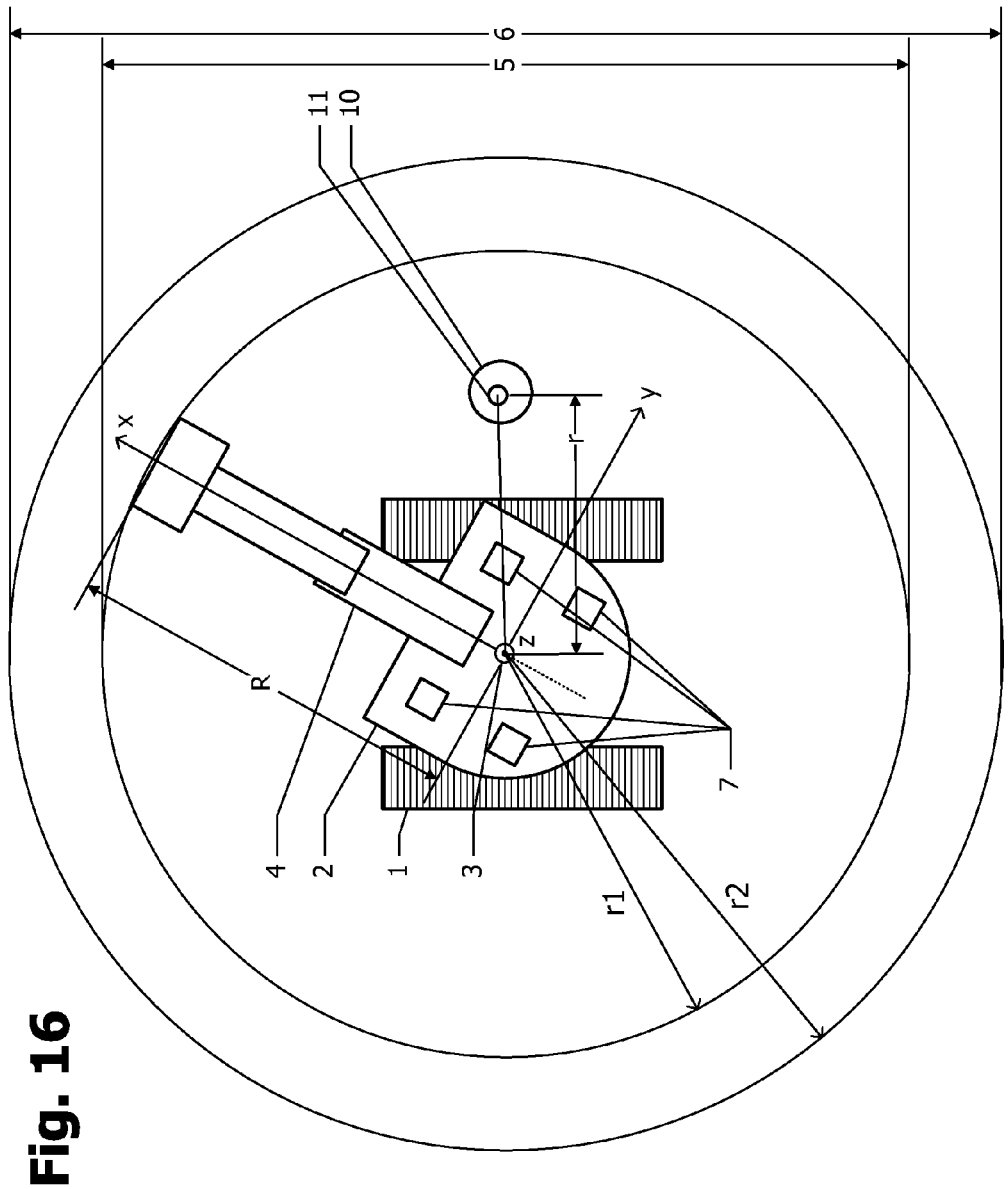
FIG. 16 is a plan view of an electric swiveling apparatus according to Embodiment 4.

FIG. 16 illustrates a plan view of the electric swiveling apparatus according to Embodiment 4. In Embodiment 3, the first monitoring region 5 (FIG. 12) and the second monitoring region 6 (FIG. 12) are fan-shaped regions. In Embodiment 4, as illustrated in FIG. 16, the first monitoring region 5 and the second monitoring region 6 are circular-shaped regions having the swiveling center 3 as the center. The radius of the first monitoring region 5 is represented as r1 and the radius of the second monitoring region 6 is represented as r2. The radius r2 is greater than the radius r1. For example, the radius r1 is set in the maximum value of the length R of the attachment, and the radius r2 is set at 1.1 times the maximum value of the length R of the attachment.

If the obstacle is present within the first monitoring region 5, and if the obstacle is present within a circular ring-shaped region inside the second monitoring region 6 and outside the first monitoring region 5, a method of controlling the swiveling operation is the same as any one of Embodiments 1 to 3.

In Embodiment 4, if the obstacle approaches, the swiveling operation is forcibly stopped or the upper limit value of the swiveling velocity is regulated regardless of the azimuth of the attachment. Accordingly, it is possible to sufficiently secure safety.

Embodiment 5

The electric swiveling apparatus according to Embodiment 5 will be described referring to FIG. 17. Hereinafter, the description will be given regarding a difference from controlling the swiveling according to Embodiment 1, and the description for the same function will not be repeated.

Figure 17:
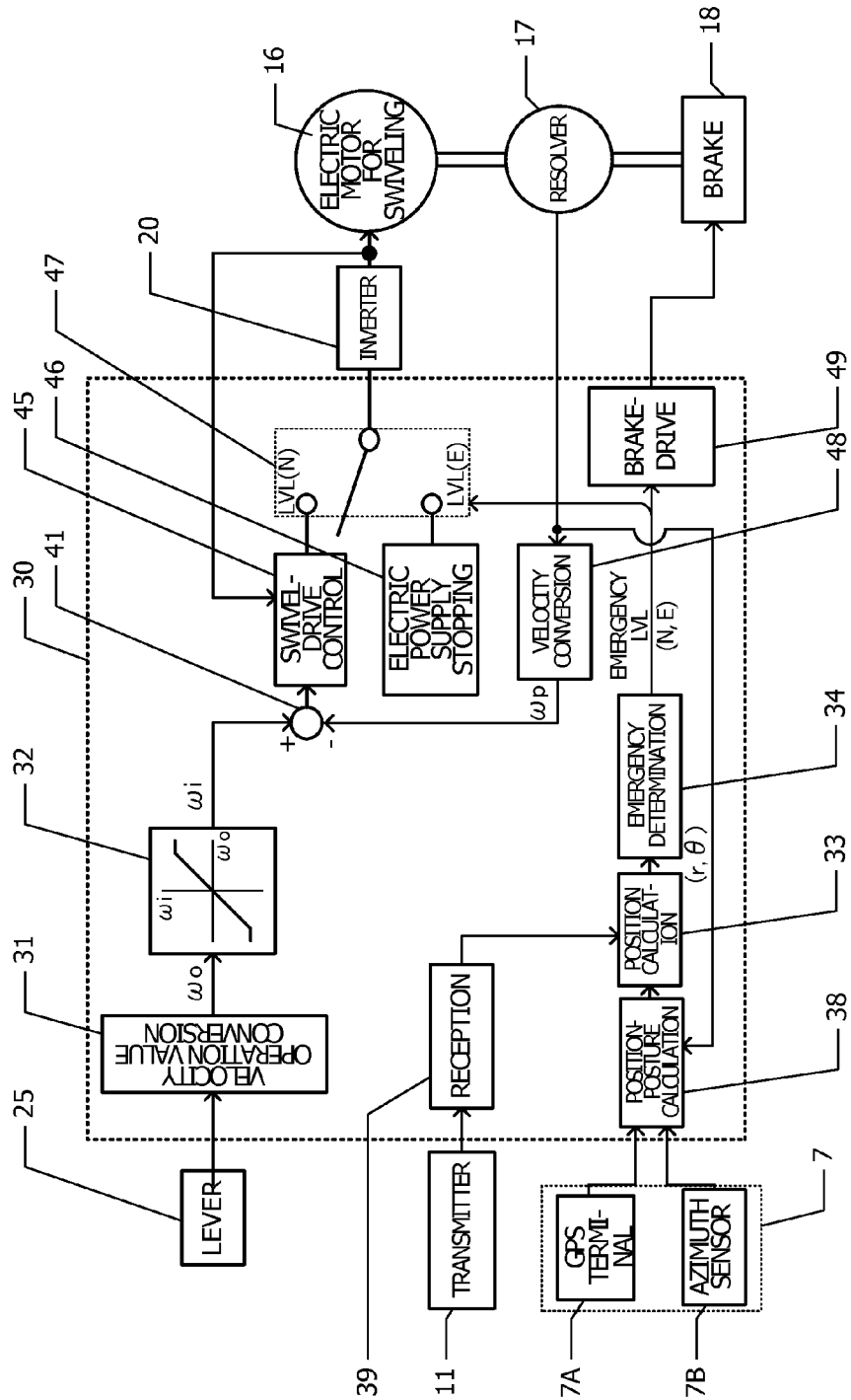
FIG. 17 is a functional block diagram of controlling the swiveling of an electric swiveling apparatus according to Embodiment 5.

FIG. 17 illustrates a functional block diagram of controlling the swiveling of the electric swiveling apparatus according to Embodiment 5. In Embodiment 5, the detector 7 includes a GPS terminal 7A and an azimuth sensor 7B. The GPS terminal 7A calculates the global coordinates (latitude and longitude) of the swiveling center 3 (FIG. 1) of the electric swiveling apparatus. The azimuth sensor 7B detects a forward azimuth of the traveling body 1 (FIG. 1) in the global coordinate system. The global coordinates calculated by the GPS terminal 7A and the azimuthal information detected by the azimuth sensor 7B are input to a position-posture calculation unit 38 of the control device 30. A position information of the electric motor 16 for swiveling in the swiveling direction is input from the resolver 17 to the position-posture calculation unit 38.

The position-posture calculation unit 38 calculates an azimuth (azimuth of x-axis) of the attachment 4 (FIG. 1) in the global coordinate system based on the forward azimuth information of the traveling body 1 (FIG. 1) which is input from the azimuth sensor 7B and the position information of the electric motor 16 for swiveling in the swiveling direction which is input from the resolver 17.

The GPS terminal is attached to the helmet 10 (FIG. 1) of the worker. The global coordinates (position information) of the worker who is equipped with the helmet 10 are transmitted from the transmitter 11. A reception unit 39 of the control device 30 receives the position information that is transmitted from the transmitter 11. The received position information is input to the position calculation unit 33.

The position calculation unit 33 calculates a distance r (FIG. 1) between the swiveling center 3 and the worker based on the global coordinates of the worker and the global coordinates of the swiveling center 3 of the electric swiveling apparatus. Furthermore, the position calculation unit 33 calculates the azimuth angle θ (FIG. 1) based on the global coordinates of the swiveling center 3 and the worker, and the azimuth of the x-axis. The calculated distance r and the azimuth angle θ are input to the emergency determination unit 34. The process of the emergency determination unit 34 is the same as that of the emergency determination unit 34 of the electric swiveling apparatus according to Embodiment 1. In this way, the emergency level is determined based on the relative positional relationship between the worker and the attachment.

If the azimuth sensor 7B is mounted on the swiveling body 2 (FIG. 1), an orientation azimuth (azimuth of x-axis) of the attachment 4 is directly measured by the azimuth sensor 7B. Therefore, it is not necessary to employ the position information of the electric motor 16 for swiveling in the swiveling direction which is detected by the resolver 17 to obtain the orientation azimuth of the attachment 4. In this case, the position information and the azimuth information may be input from the GPS terminal 7A and the azimuth sensor 7B to the position calculation unit 33.

Embodiment 6

The electric swiveling apparatus according to Embodiment 6 will be described referring to FIGS. 18 and 19. Hereinafter, the description will be given regarding a difference from the electric swiveling apparatus according to Embodiment 1, and the description for the same function will not be repeated.

Figure 18:
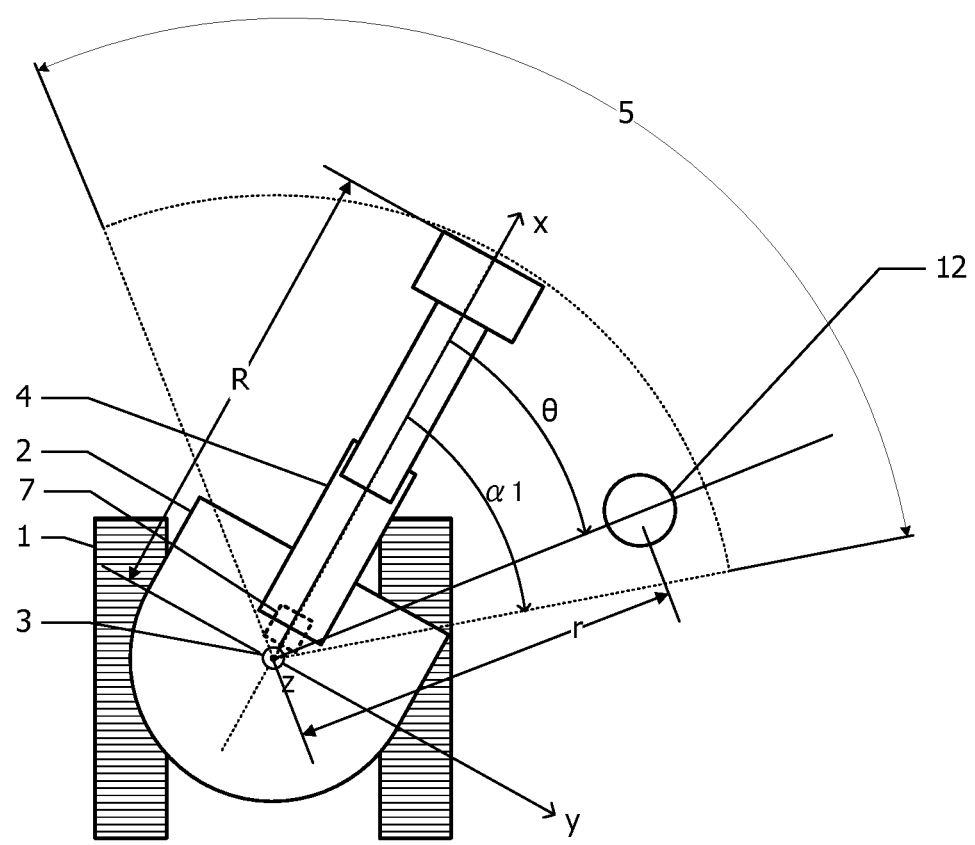
FIG. 18 is a plan view of an electric swiveling apparatus according to Embodiment 6.

FIG. 18 illustrates a plan view of the electric swiveling apparatus according Embodiment 6. In Embodiment 6, a millimeter-wave radar is employed as the obstacle detector 7. The obstacle detector 7 is installed in the vicinity of the swiveling center 3. The obstacle detector 7 radiates a millimeter-wave in the positive direction of the x-axis to measure a distance to an obstacle 12 in front. A radiation direction of the millimeter-wave is scanned within the xy-plane with the x-axis as a center. A mechanical scanning method, a beam switching method and the like can be employed for scanning the millimeter-wave.

Figure 19:
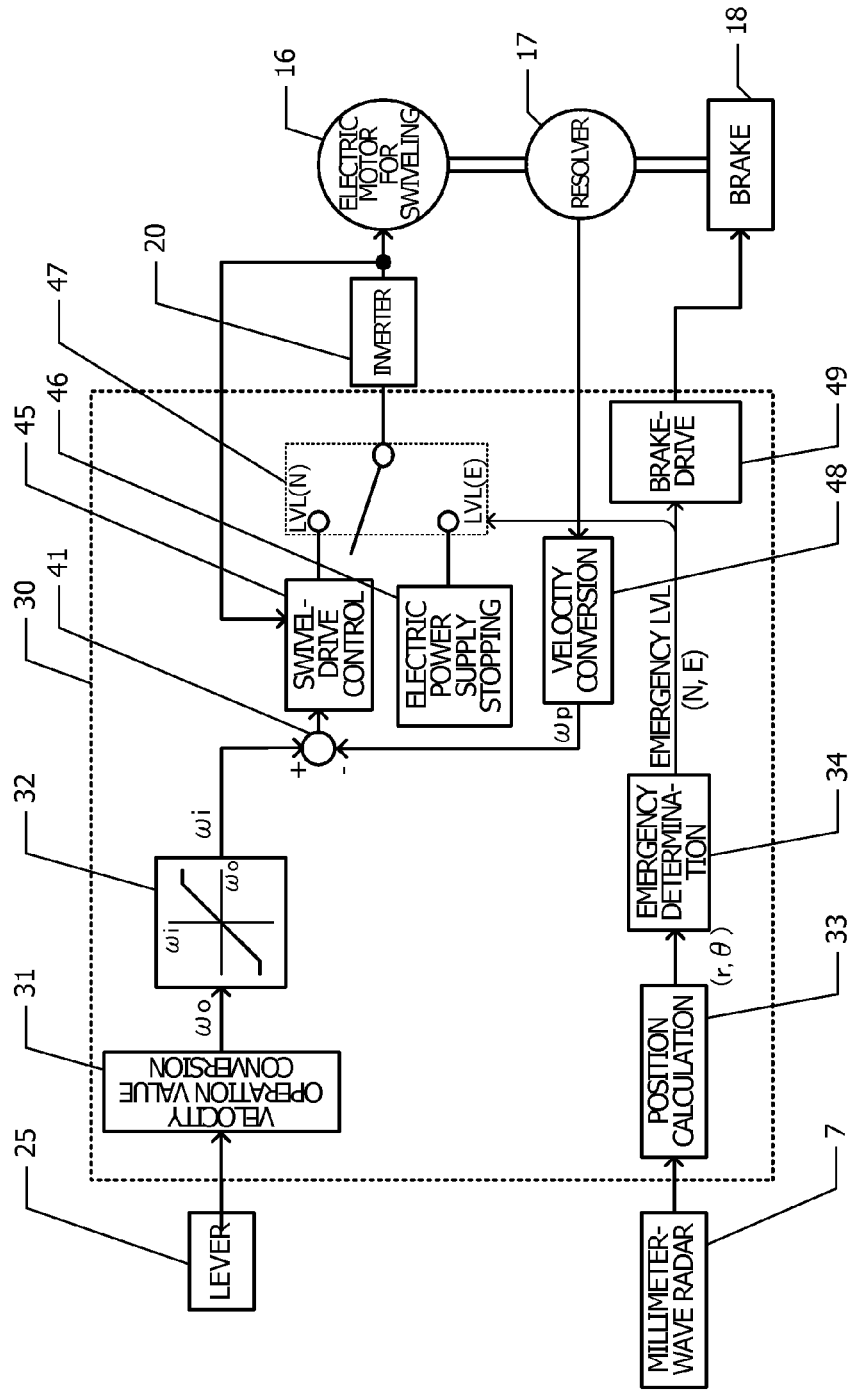
FIG. 19 is a functional block diagram of controlling the swiveling of the electric swiveling apparatus according to Embodiment 6.

FIG. 19 illustrates a functional block diagram of controlling the swiveling of the electric swiveling apparatus according to Embodiment 6. The detected result of the obstacle detector (millimeter-wave radar) 7 is input to the position calculation unit 33 of the control device 30. The position calculation unit 33 calculates the relative coordinates (r, θ) of the obstacle 12 within the first monitoring region 5 based on the detected result of the millimeter-wave radar.

The millimeter-wave is scanned within a range of the central angle of the first monitoring region 5 such that the obstacle 12 within the first monitoring region 5 can be detected. The obstacle 12 within the second monitoring region 6 illustrated in FIG. 12 can be detected as well by widening the central angle for scanning the millimeter-wave.

Embodiment 7

The electric swiveling apparatus according to Embodiment 7 will be described referring to FIGS. 20 and 21. Hereinafter, the description will be given regarding a difference from the electric swiveling apparatus according to Embodiment 6, and the description for the same function will not be repeated.

Figure 20:
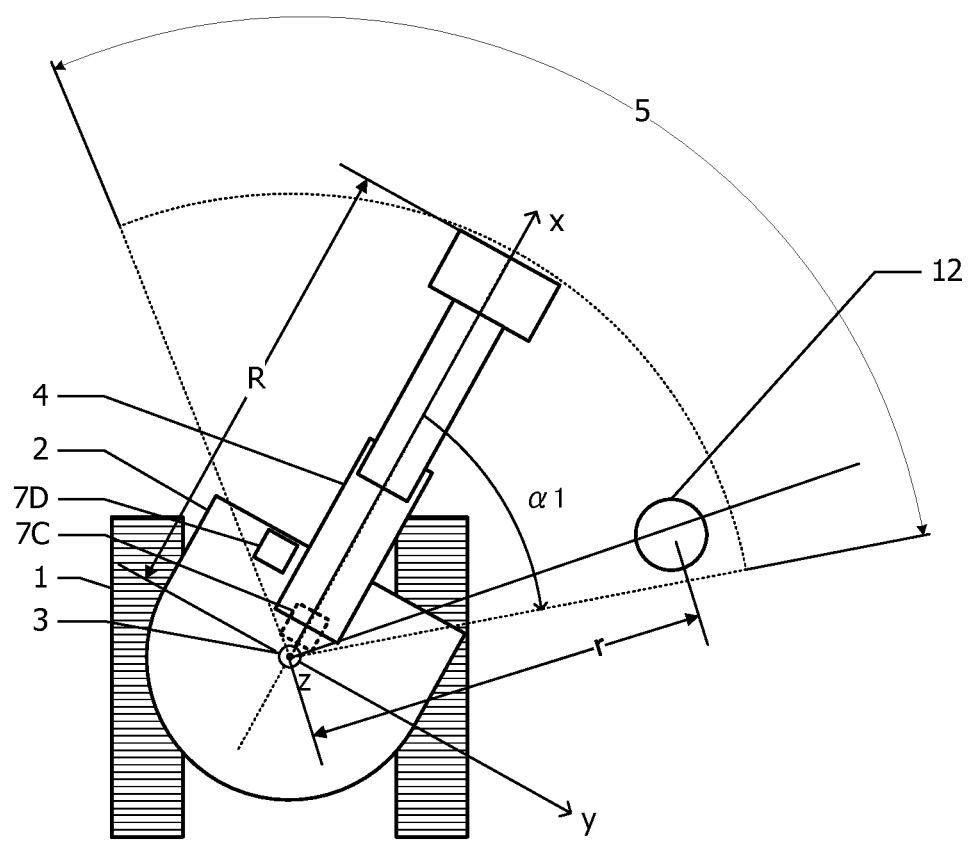
FIG. 20 is a plan view of an electric swiveling apparatus according to Embodiment 7.

FIG. 20 illustrates a plan view of the electric swiveling apparatus according to Embodiment 7. In Embodiment 7, the obstacle detector 7 is configured to include a millimeter-wave radar 7C and an imaging device 7D.

Figure 21:
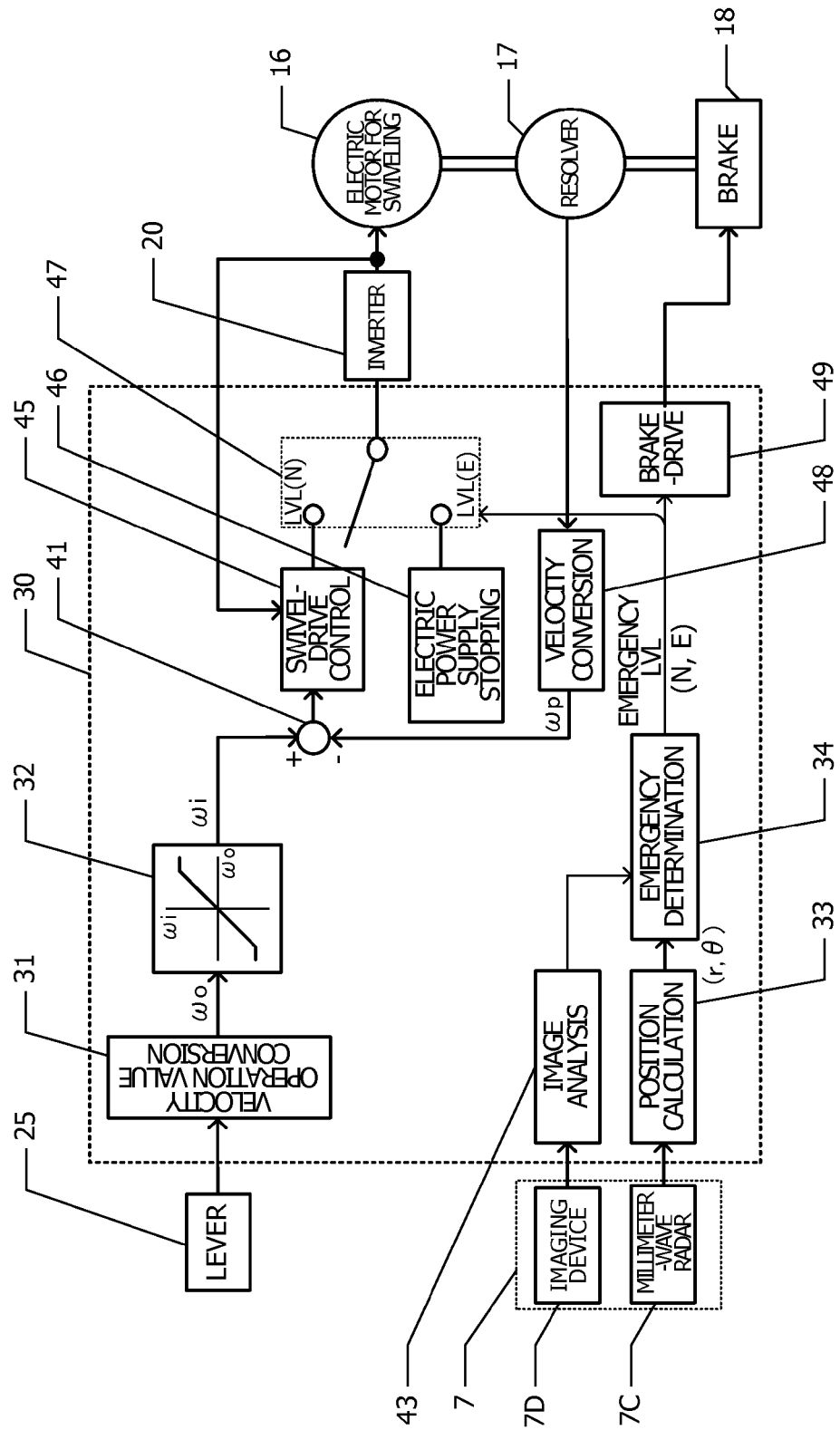
FIG. 21 is a functional block diagram of controlling the swiveling of the electric swiveling apparatus according to Embodiment 7.

FIG. 21 illustrates a functional block diagram of controlling the swiveling of the electric swiveling apparatus according to Embodiment 7. The position calculation unit 33 calculates the relative coordinates (r, θ) of the obstacle 12 (FIG. 20) within the first monitoring region 5 based on the detected result from the millimeter-wave radar 7C. If the millimeter-wave radar 7C is mounted on the swiveling body 2, the millimeter-wave is radiated from a height of approximately 1 meter above the ground. Since right under a propagation path of the millimeter-wave becomes a blind spot, a man sitting right in front of the traveling body 1 may not be detected. The imaging device 7D images a region of the blind spot of the millimeter-wave radar 7C.

Image data obtained by the imaging device 7D is input to an image analysis unit 43 of the control device 30. The image analysis unit 43 analyzes the obtained image to perform extracting of a human body from the image. The extracting of the human body can be performed by the extracting a characteristic shape of a human body's outline. If a human body is extracted, the relative coordinates (r, θ) of the human body is calculated through the image data. The calculated result is input to the emergency determination unit 34.

The emergency determination unit 34 determines the emergency level based on the position information of the obstacle which is input from the position calculation unit 33 and the position information of the human body which is input from the image analysis unit 43. For example, if a human body is detected within the first monitoring region 5, the emergency level is designated as the level E. In Embodiment 7, since a man sitting right in front of the traveling body 1 can be detected, reliability in detection of the obstacle within the first monitoring region 5 can be increased.

Hereinbefore, the invention is described according to the Embodiments. However, the invention is not limited thereto. For example, it is obvious to those skilled in the art that various changes, improvements and combinations can be made.

REFERENCE SIGNS LIST

1 traveling body (base)
2 swiveling body
3 swiveling center
4 attachment
5 first monitoring region
6 second monitoring region
7 obstacle detector
7A GPS terminal
7B azimuth sensor
7C millimeter-wave radar
7D imaging device
10 helmet
11 transmitter
12 obstacle
16 electric motor for swiveling
17 resolver
18 mechanical brake
20 inverter
25 swiveling lever
30 control device
31 velocity operation value conversion unit
32 velocity command conversion unit
33 position calculation unit
34 emergency determination unit
35 regulation velocity operation unit
36 comparing unit
37 regulation velocity generation unit
38 position-posture calculation unit
39 reception unit
40 first switching unit
41 comparator
43 image analysis unit
45 swivel-drive control unit
46 electric power supply stopping signal generation unit
47 second switching unit
48 velocity conversion unit
49 mechanical brake-drive unit
52 swing center
53 boom
54 arm
55 excavating bucket
57A, 57B, 57C vertical angle sensor
60 DC power source
61 half bridge circuit
62, 63 switching element
101A, 101B hydraulic motor
107 boom cylinder
108 arm cylinder
109 excavating bucket cylinder
111 engine
112 motor generator
113 transmission
114 main pump
115 pilot pump
116 high pressure hydraulic line
117 control valve
118 inverter
119 charging circuit
124 transmission
125 pilot line
126 operation device
127, 128 hydraulic line
129 pressure sensor
132 starting key
135 display device FIG. 2
MECHANICAL DRIVE SYSTEM
HIGH PRESSURE HYDRAULIC LINE
PILOT LINE
ELECTRICAL DRIVE AND CONTROL SYSTEM
16 ELECTRIC MOTOR FOR SWIVELING
17 RESOLVER
18 MECHANICAL BRAKE
20 INVERTER
30 CONTROL DEVICE
30B INTERNAL MEMORY
111 ENGINE
112 MOTOR GENERATOR
113 TRANSMISSION
114 MAIN PUMP
117 CONTROL VALVE
118 INVERTER
119 CHARGING CIRCUIT
124 TRANSMISSION
126 OPERATION DEVICE
129 PRESSURE SENSOR
132 STARTING KEY
135 DISPLAY DEVICE FIG. 4
7 DETECTOR
16 ELECTRIC MOTOR FOR SWIVELING
17 RESOLVER
18 BRAKE
20 INVERTER
25 LEVER
31 VELOCITY OPERATION VALUE CONVERSION
33 POSITION CALCULATION
34 EMERGENCY DETERMINATION
EMERGENCY LVL (N, E)
45 SWIVEL-DRIVE CONTROL

46 ELECTRIC POWER SUPPLY STOPPING
48 VELOCITY CONVERSION
49 BRAKE-DRIVE
FIG. 6
  VELOCITY COMMAND VALUE $\omega i$
  VELOCITY OPERATION VALUE $\omega o$
FIG. 7
  START
  S1 IS EMERGENCY IN LEVEL E?
  S2 SEND CONTROL SIGNAL FOR STOPPING ELECTRIC POWER SUPPLY TO INVERTER.
  S3 OPERATE MECHANICAL BRAKE.
  S4 INPUT VELOCITY COMMAND VALUE $\omega i$ INTO SWIVEL-DRIVE CONTROL UNIT.
  S5 CAUSE SWIVEL-DRIVE CONTROL UNIT TO CONTROL INVERTER.
  S6 STOP
  END
FIG. 8
  7 DETECTOR
  16 ELECTRIC MOTOR FOR SWIVELING
  17 RESOLVER
  18 BRAKE
  20 INVERTER
  25 LEVER
  31 VELOCITY OPERATION VALUE CONVERSION
  33 POSITION CALCULATION
  34 EMERGENCY DETERMINATION
  EMERGENCY LVL (N, E)
  36 COMPARISON
  45 SWIVEL-DRIVE CONTROL
  48 VELOCITY CONVERSION
  49 BRAKE-DRIVE
FIG. 9
  REGULATION VELOCITY $\omega L$
  AZIMUTH ANGLE $\theta$
FIG. 10
  START
  SA1 IS EMERGENCY IN LEVEL E?
  SA2 INPUT EMERGENCY COMMAND VALUE $\omega c$ INTO SWIVEL-DRIVE CONTROL UNIT.
  SA3 CAUSE SWIVEL-DRIVE CONTROL UNIT TO CONTROL INVERTER.
  SA4 AFTER CHECKING STOP OF SWIVELING, OPERATE MECHANICAL BRAKE.
  SA5 INPUT VELOCITY COMMAND VALUE $\omega i$ INTO SWIVEL-DRIVE CONTROL UNIT.
  SA6 CAUSE SWIVEL-DRIVE CONTROL UNIT TO CONTROL INVERTER.
  SA7 STOP
  END
FIG. 11
  7 DETECTOR
  16 ELECTRIC MOTOR FOR SWIVELING
  17 RESOLVER
  18 BRAKE
  20 INVERTER
  25 LEVER
  31 VELOCITY OPERATION VALUE CONVERSION
  33 POSITION CALCULATION
  34 EMERGENCY DETERMINATION
  EMERGENCY LVL (N, E)
  45 SWIVEL-DRIVE CONTROL
  48 VELOCITY CONVERSION
  49 BRAKE-DRIVE
FIG. 13
  7 DETECTOR
  16 ELECTRIC MOTOR FOR SWIVELING
  17 RESOLVER
  18 BRAKE
  20 INVERTER
  25 LEVER
  31 VELOCITY OPERATION VALUE CONVERSION
  33 POSITION CALCULATION
  34 EMERGENCY DETERMINATION
  EMERGENCY LVL (N, E1, E2)
  36 COMPARISON
  45 SWIVEL-DRIVE CONTROL
  46 ELECTRIC POWER SUPPLY STOPPING
  48 VELOCITY CONVERSION
  49 BRAKE-DRIVE
FIG. 14
  REGULATION VELOCITY $\omega L$
  AZIMUTH ANGLE $\theta$
FIG. 15
  START
  SB1 IS EMERGENCY IN LEVEL E2?
  SB2 SEND CONTROL SIGNAL FOR STOPPING ELECTRIC POWER SUPPLY TO INVERTER.
  SB3 OPERATE MECHANICAL BRAKE.
  SB4 IS EMERGENCY IN LEVEL E1?
  SB5 INPUT EMERGENCY COMMAND VALUE $\omega c$ INTO SWIVEL-DRIVE CONTROL UNIT.
  SB6 CAUSE SWIVEL-DRIVE CONTROL UNIT TO CONTROL INVERTER.
  SB7 INPUT VELOCITY COMMAND VALUE $\omega i$ INTO SWIVEL-DRIVE CONTROL UNIT.
  SB8 CAUSE SWIVEL-DRIVE CONTROL UNIT TO CONTROL INVERTER.
  SB9 STOP
  END
FIG. 17
  7A GPS TERMINAL
  7B AZIMUTH SENSOR
  11 TRANSMITTER
  16 ELECTRIC MOTOR FOR SWIVELING
  17 RESOLVER
  18 BRAKE
  20 INVERTER
  25 LEVER
  31 VELOCITY OPERATION VALUE CONVERSION
  33 POSITION CALCULATION
  34 EMERGENCY DETERMINATION
  EMERGENCY LVL (N, E)
  38 POSITION-POSTURE CALCULATION
  39 RECEPTION
  45 SWIVEL-DRIVE CONTROL
  46 ELECTRIC POWER SUPPLY STOPPING
  48 VELOCITY CONVERSION
  49 BRAKE-DRIVE
FIG. 19
  7 MILLIMETER-WAVE RADAR
  16 ELECTRIC MOTOR FOR SWIVELING
  17 RESOLVER
  18 BRAKE
  20 INVERTER
  25 LEVER
  31 VELOCITY OPERATION VALUE CONVERSION
  33 POSITION CALCULATION
  34 EMERGENCY DETERMINATION
  EMERGENCY LVL (N, E)
  45 SWIVEL-DRIVE CONTROL

46 ELECTRIC POWER SUPPLY STOPPING
48 VELOCITY CONVERSION
49 BRAKE-DRIVE

FIG. 21

7C MILLIMETER-WAVE RADAR
7D IMAGING DEVICE
16 ELECTRIC MOTOR FOR SWIVELING
17 RESOLVER
18 BRAKE
20 INVERTER
25 LEVER
31 VELOCITY OPERATION VALUE CONVERSION
33 POSITION CALCULATION
34 EMERGENCY DETERMINATION
EMERGENCY LVL (N, E)
43 IMAGE ANALYSIS
45 SWIVEL-DRIVE CONTROL
46 ELECTRIC POWER SUPPLY STOPPING
48 VELOCITY CONVERSION
49 BRAKE-DRIVE

The invention claimed is:

1. A shovel provided with an electric swiveling apparatus comprising:
   a base;
   a swiveling body that is installed on the base in a swivelable manner;
   an electric motor for swiveling that swivels the swiveling body;
   an inverter that supplies electric power to the electric motor for swiveling;
   a control unit that transmits a control signal to the inverter to control the electric power which is supplied to the electric motor for swiveling; and
   an obstacle detector that detects obstacles around the base and transmits detected results to the control unit,
   wherein the control unit determines presence or absence of the obstacle within a monitoring region on the basis of a detected result from the obstacle detector, and
   when the obstacle is not present inside the monitoring region, the control signal transmitted to the inverter is on the basis of a second command value that is generated based on an operation amount by an operator, and
   when the obstacle is present inside the monitoring region, the control signal transmitted to the inverter is on the basis of a first command value based on a regulation velocity that is stored in advance and the control unit stops the electric motor for swiveling.

2. The shovel provided with an electric swiveling apparatus according to claim 1, further comprising:
   a mechanical brake that applies a mechanical brake force to the swiveling body,
   wherein when the obstacle is present within the monitoring region, the control unit operates the mechanical brake.

3. The shovel provided with an electric swiveling apparatus according to claim 1,
   wherein the control signal that is transmitted on the basis of the first command value is a signal that applies brake torque to the swiveling body by the electric motor for swiveling.

4. The shovel provided with an electric swiveling apparatus according to claim 1,
   wherein when the regulation velocity is greater than the second command value, the first command value is set with the value of the second command value.

5. The shovel provided with an electric swiveling apparatus according to claim 1,
   wherein the control unit stores a velocity pattern that defines a relationship between a relative position, regarding the swiveling body and the obstacle in a swiveling direction, and the regulation velocity, and
   the control unit generates the regulation velocity on the basis of the velocity pattern and the relative position, regarding the swiveling body and the obstacle that is detected.

6. A method of controlling a shovel which includes a base; a swiveling body that is installed on the base in a swivelable manner; an electric motor for swiveling that swivels the swiveling body; an inverter that supplies electric power to the electric motor for swiveling; a control unit that transmits a control signal to the inverter to control the electric power which is supplied to the electric motor for swiveling; and an obstacle detector that detects an obstacle around the base and transmits a detected result to the control unit, the method comprising:
   a step of transmitting the control signal to the inverter to control the electric power which is supplied to the electric motor for swiveling;
   a step of determining presence or absence of the obstacle by the control unit within a monitoring region on the basis of the detected result from the obstacle detector, wherein, when the obstacle is not present inside the monitoring region, the control signal transmitted to the inverter is on the basis of a second command value that is generated based on an operation amount by an operator, and, when the obstacle is present inside the monitoring region, the control signal transmitted to the inverter is on the basis of a first command value based on a regulation velocity that is stored in advance; and
   a step of stopping the electric motor for swiveling by transmitting the control signal to the inverter by the control unit when the obstacle is present inside the monitoring region.

7. The method of controlling a shovel provided with an electric swiveling apparatus according to claim 6,
   wherein the shovel further includes a mechanical brake that applies a mechanical brake force to the swiveling body, and
   the method further comprises:
      a step of operating the mechanical brake by the control unit when the control unit determines that the obstacle is present within the monitoring region in the step of determining.

8. The method of controlling a shovel provided with an electric swiveling apparatus according to claim 6,
   wherein the control signal that is transmitted on the basis of the first command value is a signal that applies brake torque to the swiveling body by the electric motor for swiveling.

9. The method of controlling a shovel provided with an electric swiveling apparatus according to claim 6,
   wherein when the regulation velocity is greater than the second command value, the control unit sets the first command value with the value of the second command value.

10. The method of controlling a shovel provided with an electric swiveling apparatus according to claim 6,
    wherein the control unit stores a velocity pattern that defines a relationship between a relative position, regarding the swiveling body and the obstacle in a swiveling direction, and the regulation velocity, and the method further comprises:
- a step of generating the regulation velocity on the basis of the velocity pattern and the relative position, regarding the swiveling body and the obstacle that is detected.

11. The shovel provided with an electric swiveling apparatus according to claim 2,
- wherein the control unit determines an emergency level based on a position of the obstacle that is detected, and decides whether to operate the mechanical brake or to transmit the control signal to the inverter.

12. The method of controlling a shovel provided with an electric swiveling apparatus according to claim 7, further comprising:
- a step of determining an emergency level based on a position of the obstacle that is detected; and
- a step of deciding whether to operate the mechanical brake or to transmit the control signal to the inverter.

* * * * *